US 8,534,882 B2

(12) United States Patent
Ohtsuka et al.

(10) Patent No.: US 8,534,882 B2
(45) Date of Patent: Sep. 17, 2013

(54) ASSEMBLING STRUCTURE FOR VEHICLE ROOM ILLUMINATION LAMP

(75) Inventors: Haruhito Ohtsuka, Makinohara (JP); Ryohei Konishi, Fujieda (JP); Yusuke Yoshizoe, Fujieda (JP); Ryohei Ochiai, Fujieda (JP)

(73) Assignee: Yazaki Corporation, Tokyo (JP)

( * ) Notice: Subject to any disclaimer, the term of this patent is extended or adjusted under 35 U.S.C. 154(b) by 497 days.

(21) Appl. No.: 12/697,806

(22) Filed: Feb. 1, 2010

(65) Prior Publication Data

US 2010/0195348 A1   Aug. 5, 2010

(30) Foreign Application Priority Data

Feb. 2, 2009  (JP) ................. P2009-021309
Feb. 6, 2009  (JP) ................. P2009-026550

(51) Int. Cl.
 *F21V 15/00* (2006.01)
(52) U.S. Cl.
 USPC ............ 362/365; 362/368; 362/396; 362/375
(58) Field of Classification Search
 USPC ................. 362/490, 365, 368, 396, 549, 390, 362/369, 374, 375
 See application file for complete search history.

(56) References Cited

U.S. PATENT DOCUMENTS

| 6,467,937 | B2* | 10/2002 | Nagata et al. | 362/490 |
| 6,595,668 | B2* | 7/2003 | Hatagishi et al. | 362/490 |
| 6,749,324 | B2* | 6/2004 | Nagai et al. | 362/490 |
| 2003/0026104 | A1 | 2/2003 | Nagai et al. | |
| 2008/0101075 | A1* | 5/2008 | Yoshida et al. | 362/418 |
| 2009/0073707 | A1* | 3/2009 | Nagai et al. | 362/490 |

FOREIGN PATENT DOCUMENTS

| CN | 1400122 | 3/2003 |
| CN | 201072085 Y | 6/2008 |
| CN | 201166342 Y | 12/2008 |
| DE | 19654527 A1 | 6/1998 |
| JP | 64-5302 U | 1/1989 |
| JP | 4-26146 U | 3/1992 |
| JP | 2000-062530 A | 2/2000 |
| JP | 2002-056913 A | 2/2002 |
| JP | 2002-067789 A | 3/2002 |
| JP | 2003-118481 A | 4/2003 |
| JP | 2004-074841 A | 3/2004 |

(Continued)

OTHER PUBLICATIONS

Chinese Office Action dated Nov. 30, 2011 for corresponding application No. 201010111817.8.
Notification of the Second Office Action dated Aug. 23, 2012 from the Patent Ofice of the People's Republic of China in a counterpart Chinese patent application.

(Continued)

*Primary Examiner* — Anh Mai
*Assistant Examiner* — Kevin Quarterman
(74) *Attorney, Agent, or Firm* — Morgan, Lewis & Bockius LLP

(57) ABSTRACT

An illumination lamp comprising: a cover including an engagement portion; a functional member including a light emitting element and a mounting portion, the light emitting element covered by the cover while the engagement portion is engaged with the mounting portion; and a designed member including a cover holder and a lock, the lock locking the functional member, and the cover holder holding the cover.

13 Claims, 31 Drawing Sheets

(56) References Cited

FOREIGN PATENT DOCUMENTS

| | | |
|---|---|---|
| JP | 2005-014824 A | 1/2005 |
| JP | 2005-238966 | 9/2005 |
| JP | 2006-021670 A | 1/2006 |
| JP | 2007-030878 A | 2/2007 |
| JP | 2007-230254 | 9/2007 |
| JP | 2008-171847 A | 7/2008 |
| WO | WO 2007/100122 | 9/2007 |

OTHER PUBLICATIONS

Notification of Reasons for Refusal dated Jan. 7, 2013 from the Japanese Patent Office in counterpart Japanese patent application No. 2009-021309.

Notification of Reasons for Refusal dated Jan. 7, 2013 from the Japanese Patent Office in counterpart Japanese patent application No. 2009-026550.

* cited by examiner

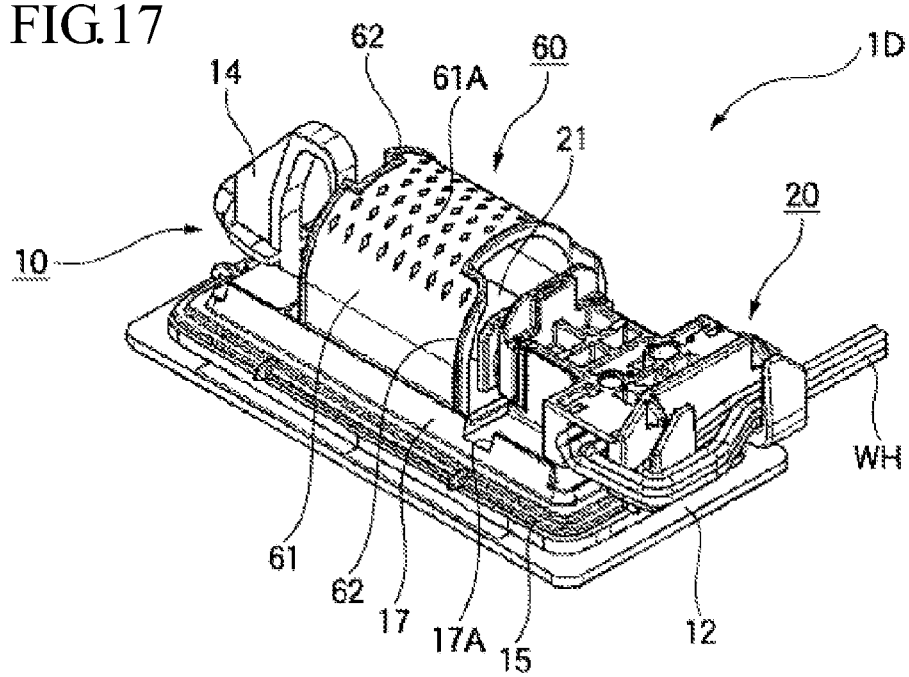
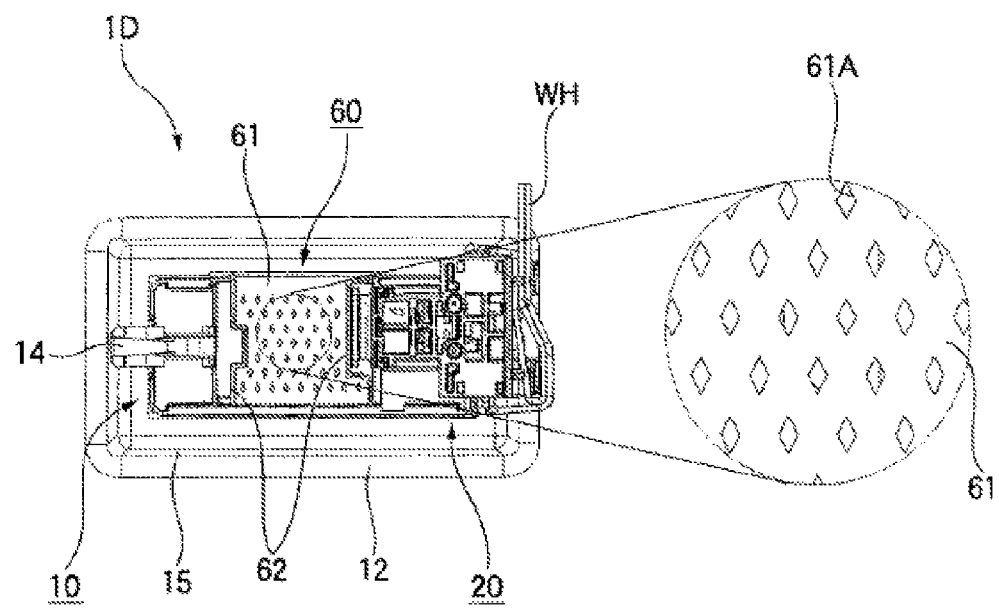

PRIOR ART

PRIOR ART

PRIOR ART

ASSEMBLING STRUCTURE FOR VEHICLE ROOM ILLUMINATION LAMP

CROSS REFERENCE TO RELATED APPLICATIONS

This application claims priority from Japanese patent Application No. 2009-021309 filed on Feb. 2, 2009 and No. 2009-026550 filed on Feb. 6, 2009, the entire subject matter of which is incorporated herein by reference.

TECHNICAL FIELD

The present invention relates to an assembling structure for a vehicle room illumination lamp. Especially, the assemble structure includes a protection cover for preventing damage to a light source. The protection cover is attached to the illumination lamp not only during transportation of the illumination lamp but also after attachment of the illumination lamp to a room of a vehicle.

BRIEF DESCRIPTION OF THE RELATED ART (Related Art 1)

There are related vehicles provided with a room illumination lamp which is provided on a ceiling so as to be at a position close to a windshield. This room illumination lamp is provided separately from a dome lamp which is provided substantially at a center of the ceiling. In many cases, the illumination lamp adopts a bulb (an electrical bulb) which has a filament as a light source.

There are also related vehicles provided with a vanity mirror and a sun visor. The sun visor protects occupant's eyes from bright sunlight. The vanity mirror is a small mirror used for applying make-up and is provided on the sun visor. In recent years, a prevalent related sun visor is provided with an additional illumination lamp in a vicinity of the vanity mirror and a cover for covering the mirrors in an openable fashion prevails. There is an increasing tendency that many room illumination lamps of these types are used on luxury models with additional values or convertibles which cannot have room illumination lamps provided thereon from the structural point of view.

A related room illumination lamp described in JP-A-2005-238966, for example, is a room illumination lamp of the above described type.

As is shown in FIG. 22, the related room illumination lamp is provided with a designed member 202 and a functional member 204. The designed member 202 is configured by fixing a lens 210 to a housing 200A. The housing 200A is attachable to an opening 101 of an interior member 100. An example of the interior member 100 is a ceiling to which the illumination lamp is attached. The functional member 204 is provided with a light source 203. The light source 203 is a filament which emits light having a predetermined chromaticity. The functional member 204 is supported by the designed member 202 and disposed at a back side of the interior member 100. The functional member 204 can be assembled together with the designed member 202 integrally.

In the above reviewed related room illumination lamp, however, the light source 203 is particularly fragile because of its material characteristics. Therefore, it is worried that the light source 203 is broken by a force applied during transportation from a manufacturing stage to an assembling stage. To deal with this problem, there is a related countermeasure. In the related countermeasure, a designed member 202 and a functional member 204 are not assembled together but are left as separate component parts before transportation. As shown in FIG. 23, for example, a protection cover 300 specialized for protecting the light source 203 covers the light source provided on the functional member 204.

This light source protection cover 300 is removed after the transportation since the protection cover 300 is so large that the protection cover 300 hinders the assembling the functional member 204 with the designed member 202 integrally. Because of the above, as shown in FIG. 22, the functional member 204 is attached to the opening 101 of the interior member 100 of a vehicle while the fragile light source 203 is exposed to the outside in a bare condition. Therefore, there is a risk that the light source 203 is contacted with something and is broken. In addition, in a case where the light source 203 is broken due to a contact with the opening 101 of the interior member 100 or the like, there is a risk that the interior member 100 about the opening 101 of the vehicle is also damaged.

(Related Art 2)

On a wall surface such as a ceiling in the inside of a vehicle, an indoor illumination lamp which illuminates the inside of the vehicle is mounted. Such an indoor illumination lamp includes a lamp unit constituted of a light source drive part, and a light source such as a bulb connected to the light source drive part so as to illuminate the inside of the vehicle. Such a lamp unit is mounted on a wall surface or an designed member arranged on the wall surface (hereinafter referred to as "wall surface or the like").

The above-mentioned lamp unit is assembled in a factory, is transported as a single unit to a vehicle on which the lamp unit is mounted and, thereafter, is mounted on a wall or the like of the vehicle. Accordingly, there is a possibility that the light source is damaged due to an impact from the outside or the like during the transportation of the lamp unit. The constitution which prevents the occurrence of such damages on the light source during the transportation is proposed in JP-A-2007-230254.

A lamp protective cover 910 described in JP-A-2007-230254 which covers a lamp unit 930 having a light source includes, as shown in FIG. 36, a pair of body covering portions 911, 912 which is connected to each other by way of a hinge 913, a pair of light source covering portions 914, 915 which is connected to the body covering portions 911, 912 respectively. The lamp protective cover 910 is formed by molding using a relatively thin resin. One body covering portion 911 is formed such that a ceiling plate 916 which is arranged on an upper side, a side plate 917 which is arranged on a right side, and a front plate 918 which is arranged on a front side surround the lamp unit 930 from three sides. The other body covering portion 912 is arranged in symmetry with one body covering portion 911 with respect to the hinge 913, and is formed such that a ceiling plate 920 which is arranged on an upper side, a side plate 921 which is arranged on a left side, and a front plate 922 which is arranged on a front side surround the lamp unit 930 from three sides.

In one light source covering portion 914, a proximal end portion which is joined to the front plate 918 is formed in a semi-quadrangular cylindrical shape, a distal end portion is formed in a semi-spherical shape, and the inside of one light source covering portion 914 is communicated with the inside of one body covering portion 911. The other light source covering part 915 is arranged in symmetry with one light source covering portion 914. In the other light source covering part 915, a proximal end portion which is joined to the front plate 922 is formed in a semi-quadrangular cylindrical shape, a distal end portion is formed in a semi-spherical shape, and the inside of the other light source covering part 915 is communicated with the inside of the other body covering portion 912.

The above-mentioned lamp protective cover 910 is mounted on the lamp unit 930 in such a manner that a light source (not shown in the drawing) is accommodated in the inside of the pair of light source covering portions 914, 915, and a functional member body 931 is accommodated in the inside of the pair of body covering portions 911, 912. In such a state, the lamp unit 930 is transported. Accordingly, the light source of the lamp unit 930 is covered with the pair of light source covering portions 914, 915 and hence, it is possible to prevent the light source from being damaged during transportation.

However, the above-mentioned lamp protective cover 910 is removed from the lamp unit 930 at the time of mounting the lamp unit 930 on the designed member 940. Accordingly, once the lamp unit 930 is mounted on a wall surface or the like of a vehicle together with the designed member 940, the light source is no more protected so that there exists a possibility that the light source is damaged by water droplets from an area above a ceiling or the accumulation of dusts, for example. To prevent the light source from being damaged, it is thought that a protective member for protecting the light source is mounted on the lamp unit 930 after mounting the lamp unit 930 on the wall surface or the like of the vehicle. However, there exists a possibility that the mounting of the protective member increases the number of parts and the number of mounting man-hours thus pushing up a cost.

SUMMARY

Exemplary embodiments of the present invention address the above disadvantage and other disadvantages not described above.

Accordingly, it is an aspect of the present invention to provide an assembling structure for a vehicle room illumination lamp which can prevent a light source or an interior member of a vehicle from being damaged when the vehicle room illumination lamp is attached to the interior member of a vehicle.

With a view to attaining the object, the invention provides an assembling structure for a vehicle room illumination lamp which will be described below.

According to a first aspect of the invention, there is provided an assembling structure for a vehicle room illumination lamp comprising: a cover including an engagement portion; a functional member including a light emitting element and a mounting portion, the light emitting element covered by the cover while the engagement portion is engaged with the mounting portion; and a designed member including a cover holder and a lock, the lock locking the functional member, and the cover holder holding the cover.

In exemplary embodiments, the cover includes a cutout portion.

In exemplary embodiments, the cover includes a plurality of vent holes on a surface thereof.

In exemplary embodiments, the cover includes a main body; a removable portion; and a connector connecting the main body and the removable portion, wherein the connector has an elongated shape which is defined by the cutout portion.

In exemplary embodiments, the engagement portion is a projection, and the mounting portion is a groove.

In exemplary embodiments, the designed member includes a bezel and a lens attached to the bezel, and the cover holder is provided between the bezel and the lens.

In exemplary embodiments, the cover holder is a groove holding an end portion of at least one side surface of the cover.

In exemplary embodiments, the cover includes a main body; and a pair of wall portions, each wall portion attached to the main body rotatable from an open condition where the light emitting element exposed between the wall portions to a closed condition where the wall portions cover the periphery of the light emitting element, the one of the wall portions having a first pawl, the other of the wall portions having a second pawl, wherein the first pawl and the second pawl are engaged each other in the closed condition.

According to a second aspect of the invention, there is provided an assembling structure for a vehicle room illumination lamp with an opening provided on an interior member of a vehicle room including: a cover including a engagement portion; a functional member including a light emitting element and a mounting portion, the light emitting element covered by the cover mounted on the mounting portion; and a designed member including a cover holder, a bezel, and a claw, the cover holder holding the cover, the bezel attached to a periphery of the opening from one side of the opening, and the claw locked on the periphery from the other side of the opening.

According to the assembling structure for a vehicle room illumination lamp of the first aspect of the invention, the functional member can be assembled to the designed member with the cover kept mounted thereon and has the shape which enables itself to pass through the opening, whereby the light source is protected by the cover when the room illumination lamp is assembled to a mounting portion of the vehicle. Consequently, a risk can be avoided of the light source or the periphery of a mounting portion on a vehicle side being damaged. In addition, even in the event that a different configuration is adopted to introduce a different variation to the functional member, since the cover can be used commonly, the molding costs for the cover can be suppressed.

Also, according to the assembling structure for a vehicle room illumination lamp of the first aspect, the cover can be assembled to the functional member with the simple structure.

Also, according to the assembling structure for a vehicle room illumination lamp of the first aspect, since the cover has the cutout, even in the event that a light source with high heat generating properties is illuminated for a long period of time, heat generated can be dissipated to the outside from the cutout, whereby the vehicle illumination lamp can be made highly safe even when the light source with high heat generating properties is used.

Also, according to the assembling structure for a vehicle room illumination lamp of the first aspect, the cover has the plurality of vent holes which are formed therein, and even in the event that a light source with high heat generating properties is illuminated for a long period of time, heat generated can be dissipated to the outside from the portions where the vent holes are formed at the same time as light from the light source can be reflected substantially uniformly, whereby the vehicle illumination lamp can be made highly safe even when the light source with high heat generating properties is used.

Also, according to the assembling structure for a vehicle room illumination lamp of the first aspect, even with a product produced to a single standard, the product can easily be modified to a construction having a high heat dissipating function according to an application to which the product is applied. Consequently, the assembling structure can finely deal with modifications according to types of illumination lamps and places and objects of installation thereof.

Since the assembling structure for a vehicle room illumination lamp of the invention enables the functional member to be mounted in the opening in the interior member of the vehicle with the cover kept mounted thereon after transportation, an advantage can be provided that when the functional member is mounted in the opening, a risk can be avoided of the light source or the periphery of the opening on the vehicle side being damaged.

Thus, the invention has been described briefly. Further, the details of the invention will be clarified further when the following exemplary embodiments of the invention are read by reference to the accompanying drawings.

BRIEF DESCRIPTION OF THE DRAWINGS

FIG. 17 is a perspective view showing a vehicle room illumination lamp according to a fourth exemplary embodiment of an assembling structure.

FIG. 18A is a plan view showing the vehicle room illumination lamp, and FIG. 18B is an enlarged view of a main part thereof.

DETAILED DESCRIPTION OF EXEMPLARY EMBODIMENTS

Hereinafter, exemplary embodiments of the invention will be described in detail with reference to the accompanying drawings.

(First Exemplary Embodiment)

Figure 1:
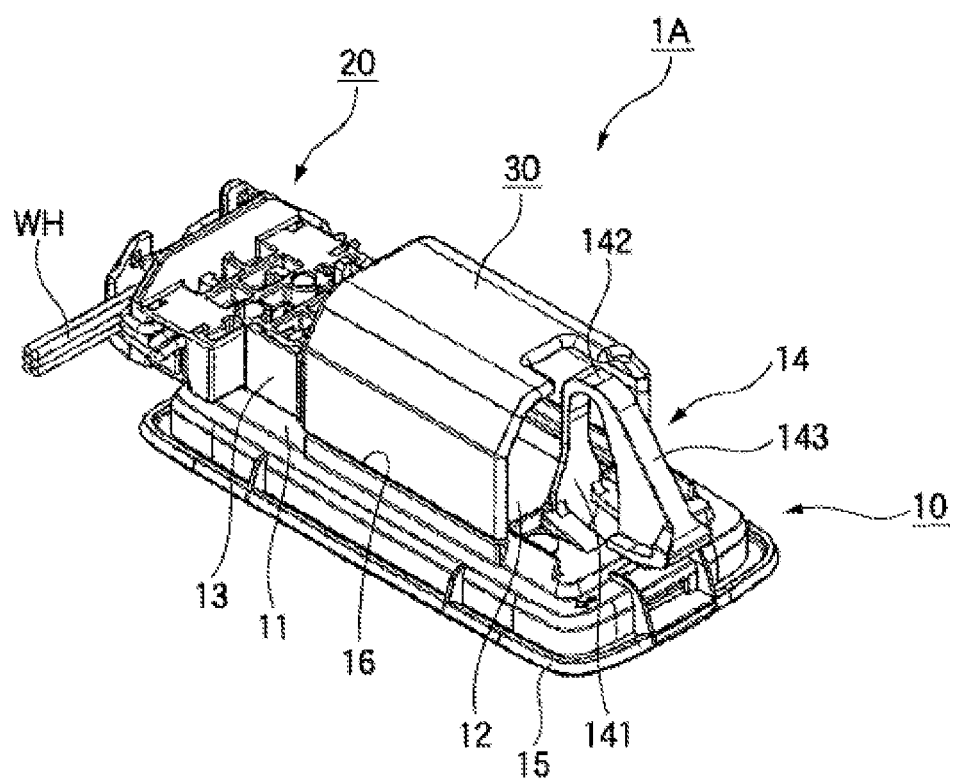
FIG. 1 is a perspective view showing a vehicle room illumination lamp according to a first exemplary embodiment of an assembling structure.
Figure 2:
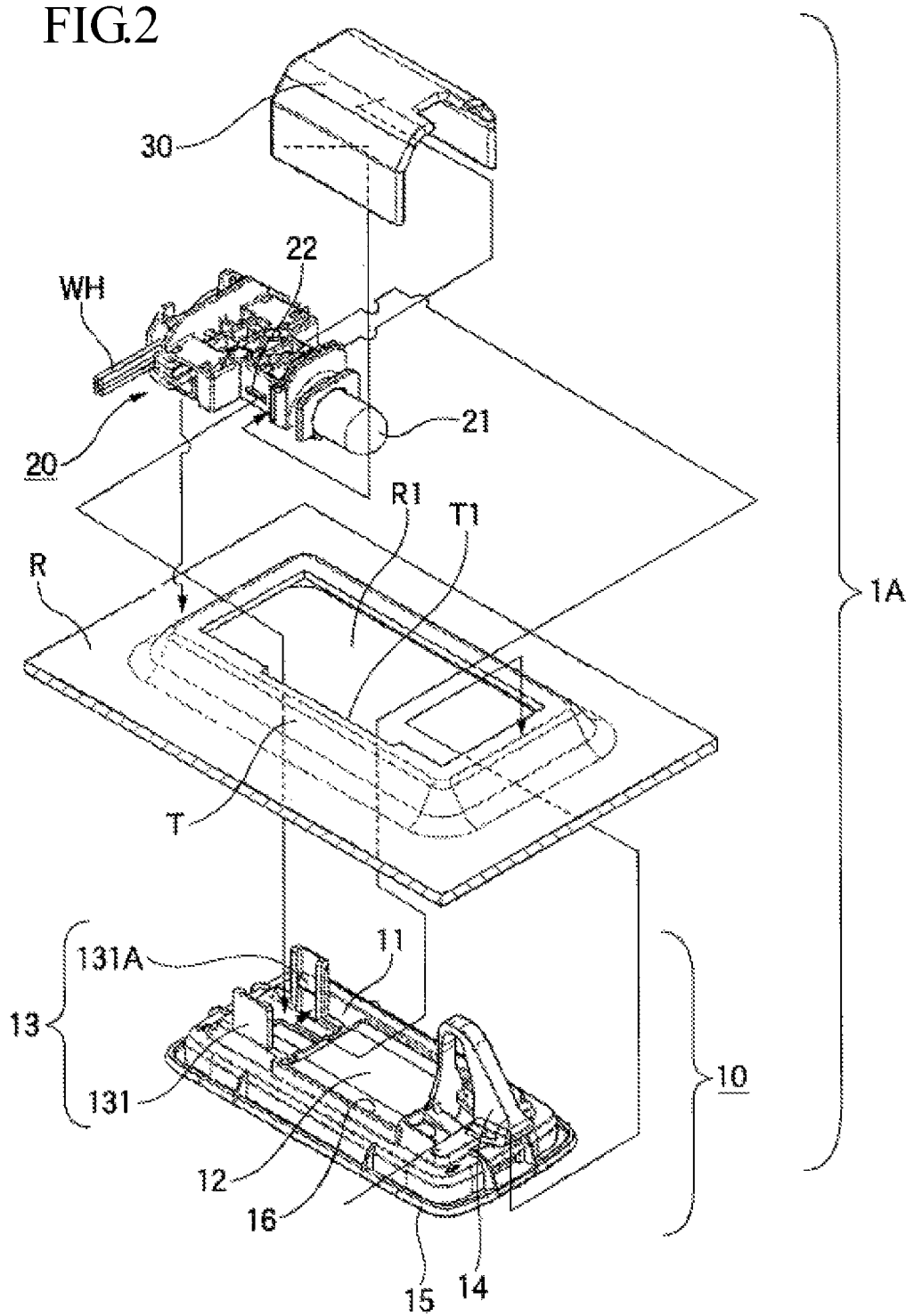
FIG. 2 is an exploded perspective view showing a condition in which the vehicle room illumination lamp is attached to an interior member.

FIGS. 1 and 2 show a vehicle room illumination lamp 1A which is formed according to a first embodiment of an assembling structure for a vehicle room illumination lamp of the present invention. The vehicle room illumination lamp 1A includes a designed member 10 and a functional member 20 which are integrally assembled together and a cover 30. The vehicle room illumination lamp 1A is fixed and attached to an opening R1 of an interior member R such as a ceiling portion of a vehicle which constitutes a mounting portion. In the figures, reference character WH denotes a wire harness.

The designed member 10 includes a housing 11 (described later). On the housing 11, a lens 12, a lock 13 and a ceiling pawl 14 are provided. The designed member 10 is to be integrally assembled with the functional member 20.

The housing 11 is to be attached to the opening R1 which is provided in a surface of the interior member R within an interior of a vehicle. In this embodiment, the housing 11 is attached to a frame-like roof trim T which is fixedly provided along a circumferential edge of the opening R1 in the interior member R. The roof trim T has a projecting shape which projects towards a deeper portion (an upper side in FIG. 2) of the interior member R. The housing 11 is attached to the roof trim T so as to hold the roof trim T from the upside and the downside of the roof trim T. Specifically, in FIG. 3, the vehicle room illumination lamp 1A is detachably attached to an interior member 2 while the roof trim T is held by a bezel 15 from the downside as indicated by broken line in FIG. 3, and by the ceiling pawl 14 of the housing 11 and the functional member 20 assembled with the housing 11 from the upside. The bezel 15 constitutes the outer circumferential edge of the housing 11.

Figure 4:
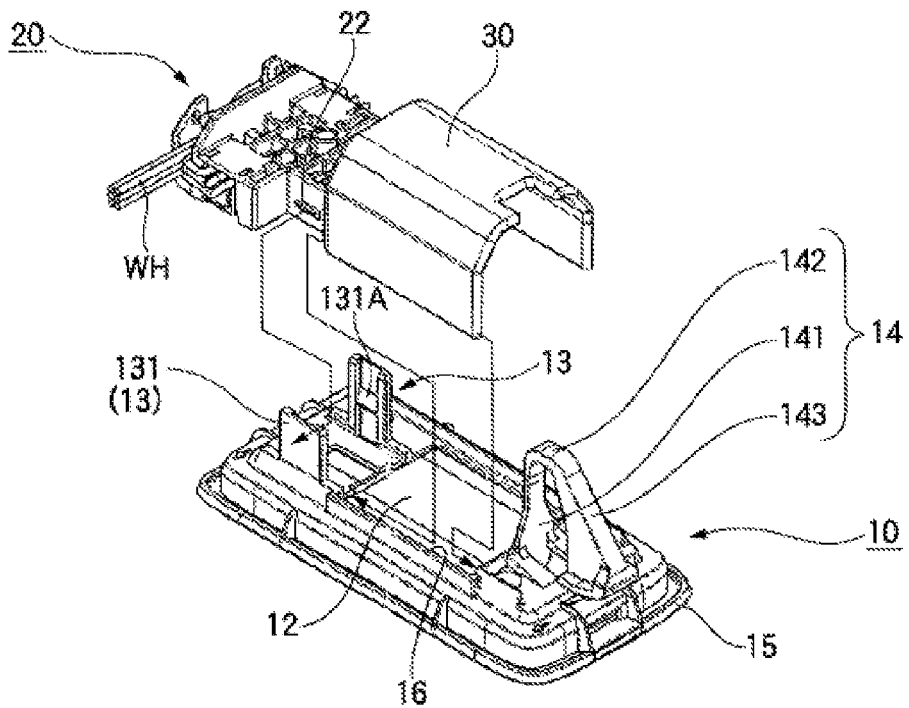
FIG. 4 is a perspective view showing a condition in which a functional member is assembled with a designed member of the vehicle room illumination lamp.

In the housing 11, as is shown in FIG. 4, the lens 12 is provided at a central portion, and this lens 12 is transparent or translucent so as to transmit light from a light source 21. The lock 13 and the ceiling pawl 14 are provided in a vicinity of longitudinal ends of the housing 11.

Of these two members, the lock 13 includes a pair of flexible brackets 131 which erects from the housing 11 while facing each other. Each of the flexible brackets 131 can bend to some extent to expand a space defined therebetween. Each of the flexible brackets 131 is provided with a locking projection 131A on an inner surface thereof respectively.

The ceiling pawl 14 includes a thin plate-like body 141, a thin plate-like neck 142, and a head 143. The body 141 erects from a front side (on a right-hand side in FIGS. 1 to 4) of the bezel 15. The neck 142 has a substantially U-shape which stretches continuously from the body 141. The head 143 slopes from the neck 142 down to the front side of the bezel 15. In particular, the body 141 and the neck 142 are configured to have spring characteristics which enable them to swing back and forth. The spring characteristics are originated from the thin plate shapes of the body 141 and the neck 142. Whereby, the head 143 which constitutes a distal end of the ceiling pawl 14, which slopes down from the end of the neck 142, is allowed to be displaced in front and rear directions.

A sloping surface of the head 143 has an unique shape and an unique inclination angle which are determined from the dynamics point of view. These unique shape and angle enable the following movement of the ceiling pawl 14. When the designed member 10 is pushed to be inserted into the roof trim T from the downside (from below in FIG. 3), the head 143 is firstly displaced to the rear (to the left in FIG. 3) direction and passes through the opening R1. Once the head 143 passes through the opening R1, the head 143 returns to its regular position by the spring characteristics of the body 141 and the neck 142. Thus, the designed member 10 is easily attached to the roof trim T.

Figure 3:
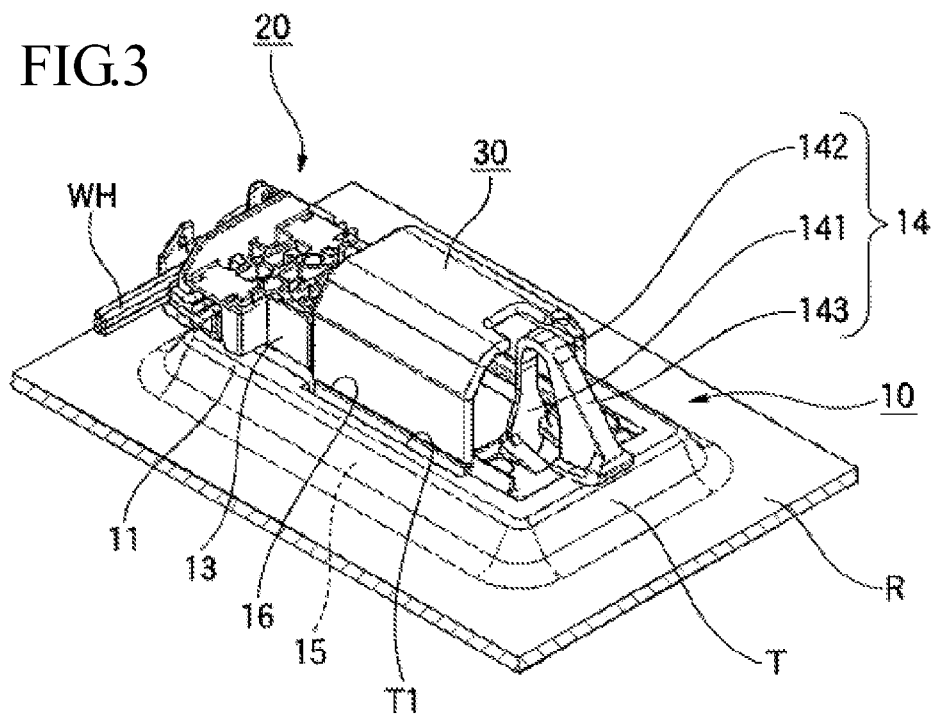
FIG. 3 is a perspective view showing a condition in which the vehicle room illumination lamp has been attached to the interior member.

Further, as is shown in FIGS. 1, 3 and 4, a cover holder 16 is provided on the housing 11. In the first embodiment, the cover holder 16 includes a substantially U-shaped groove. The cover holder 16 assists an engagement portion 31 to assemble a cover 30 with the functional member 20. In other words, the cover holder 16 is provided so as to hold the cover 30 stably by detachably inserting an end portion of at least one side surface of the cover 30 into the U-shape grove while the cover 30 is assembled to the functional member 20 (the functional member will be described later). The groove which is included in the cover holder 16 of the embodiment is provided in a single location (on a near side in FIG. 4) on one longitudinal side between the bezel 15 and the lens 12 and is surrounded by three erected walls (of which two facing walls are configured to have a triangular shape). To match this structure, as is shown in FIGS. 2 and 3, the roof trim T includes a cutout T1 which the cover holder 16 enters. The roof trim T is fixedly provided on the circumferential edge portion of the opening R1 in the interior member R.

The functional member 20 includes, as is shown in FIG. 5, the light source 21, lock pawls 22, and wire holders 23. The light source 21 is made up of a lamp or LED which illuminate an interior of the vehicle where it is installed. The lock pawls 22 can be locked in the lock 13 provided on the designed member 10 (refer to FIG. 4). In addition, the functional member 20 includes a mounting portion where the cover 30 is detachably attached for protecting the light source 21 from impact particularly generated during transportation (while being carried).

The lock pawls 22 detachably attach the functional member 20 to the designed member 10 by being locked with the lock 13 of the designed member 10. Each of the lock pawls 22 has a bar shape (stick shape), projects perpendicular to a surface of the functional member 20, and extends in the surface of the functional member 20 horizontally. The lock pawls 22 enter the lock 13 from thereabove so as to push the brackets 131 of the lock 13 to thereby expand the space defined therebetween, ride over the locking projections 131A provided on the inner surfaces of the brackets 131 to penetrate further downwards than the projections and are then brought into engagement with the locking projections 131A to be locked thereon.

The cover 30 is detachably attached to the functional member 20 on the mounting portion 24. The mounting portion 24 is a substantially circular fine groove lying between two walls rising on both sides thereof.

The cover 30 provides a reflector function to reflect light emitted from the light source 21 in a direction in which the lens 12 is provided without any light leakage to the outside and a function to protect the light source 21 from dust and droplets of water. In addition to these functions, the cover 30 is designed to protect the light source 21 of the functional member 20 from impact applied from the outside particularly during transportation of the vehicle room illumination lamp 1A and is mounted detachably on the functional member 20.

Figure 6A:
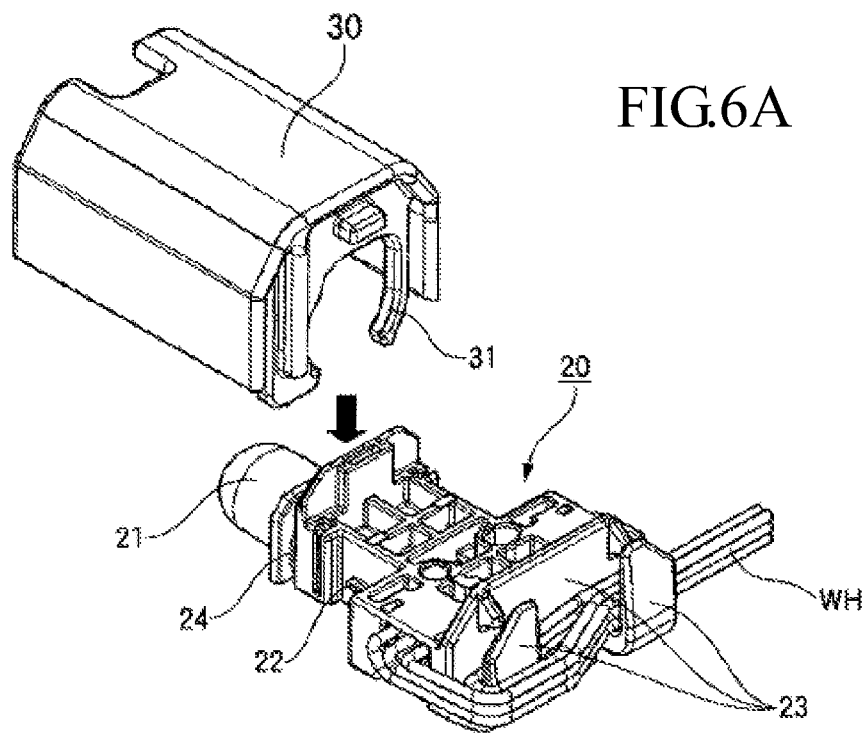
FIGS. 6A and 6B are a perspective view and a side view, respectively, which illustrate a condition in which the cover is assembled with the designed member of the vehicle room illumination lamp.
Figure 6B:
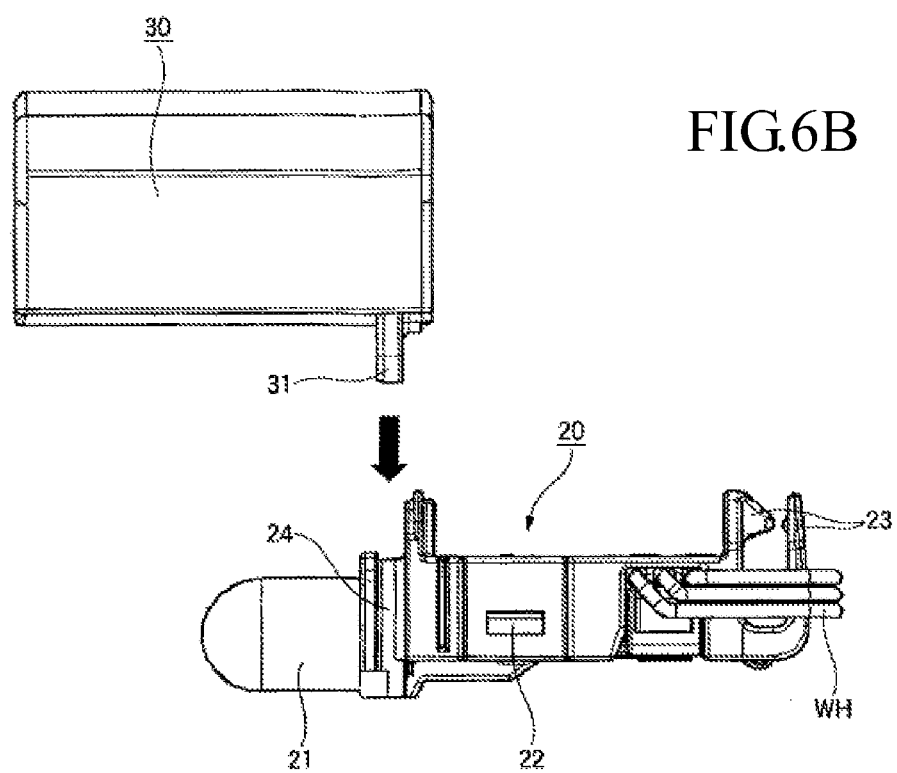

As is shown in FIG. 6, the cover 30 includes the engagement portion 31 which can be engaged with the fine groove which constitutes the mounting portion of the functional member 20. This engagement portion 31 is made up of a pair of leg portions which project downwards from an inner surface side thereof or more specifically are made up of flexible locking projections which are formed into substantially arc-like shapes so as to approach each other to narrow a space therebetween at distal end sides thereof. By the locking means 31 so constructed being securely contained in the fine groove which constitutes the mounting portion 24, the cover 30 is fixed to the functional member 20.

The cover 30 is designed to be held on the designed member 10 by at least one of end portions of both left and right side surfaces being inserted into the cover holder 16 which is made up of the substantially U-shaped receiving groove provided in the housing 11 of the functional member 20 so as to complement the stability when the cover 30 is mounted on the functional member 20 by the engagement portion 31, whereby the cover 30 is held more stably.

Next, there will be described a preliminary assembling method of the vehicle room illumination lamp 1A according to the embodiment prior to transportation and an assembling method of assembling the same illumination lamp in the opening R1 in the interior member R of the vehicle after arrival at an assembly site.

(I) Preliminary Assembly for Transportation:

Although a case will be described herein in which the cover 30 is assembled to the functional member 20 in advance based on FIG. 4, a configuration may be adopted in which the cover 30 is assembled to the functional member 20 after the functional member 20 is assembled to the designed member 10.

Figure 5A:
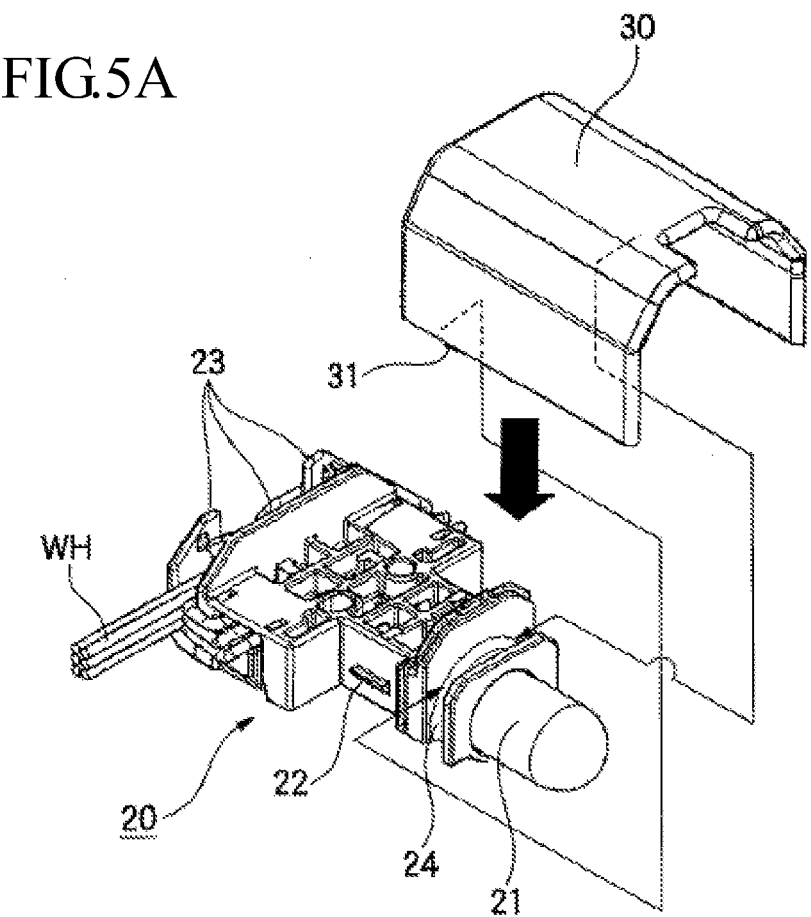
FIGS. 5A and 5B are perspective views showing conditions before and after the cover is assembled with the designed members of the vehicle room illumination lamp, respectively.
Figure 5B:
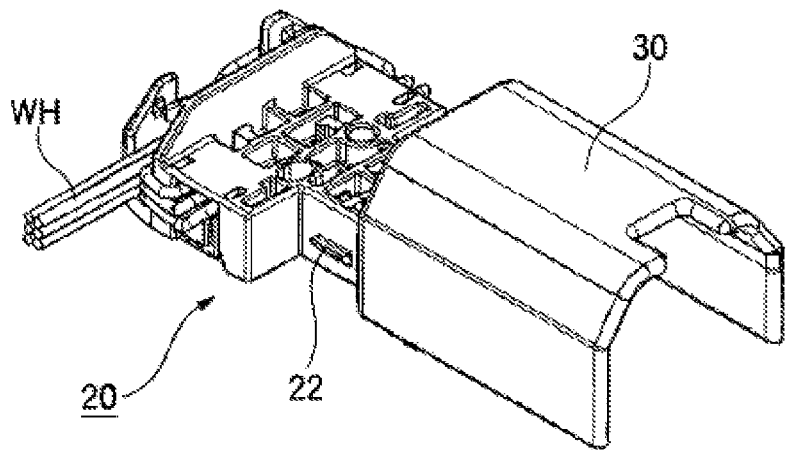

As is shown in FIGS. 5A, 5B, when the cover 30 is assembled to the functional member 20, the engagement portion 31 of the cover is fixedly fastened to the mounting portion 24 of the functional member 20.

Next, when the functional member 20 is assembled to the designed member 10, the lock pawls 22 of the functional member 20 are brought into engagement with the locking projections 131A of the lock 13 of the designed member 10 so that the lock pawls 22 are locked on the locking projections 131A (refer to FIG. 4). By this action, the vehicle room illumination lamp 1A is built up in such a condition shown in FIG. 1. When the component parts are assembled together into the condition shown in FIG. 1, the light source 21 is protected from exterior impact by the cover 30 around the full circumference thereof, and the vehicle room illumination lamp 1A is in a preferable condition for transport to the mounting site.

(II) Assembly to Vehicle after Arrival at Vehicle Assembly Site:

As is shown in FIG. 1, in the event that with the vehicle room illumination lamp built up, an upper portion of the vehicle room illumination lamp 1A, that is, an upper portion side portion thereof which includes the functional member 20 and the ceiling pawl 14 of the designed member 10 is allowed to be inserted through the opening R1 in the interior member R as it is, the upper portion side of the vehicle room illumination lamp 1A is passed through the opening R1 from the functional member 20 followed by the ceiling pawl 14.

Namely, in a last stage in which an upper side of the designed member 10 passes through the opening R1, the ceiling pawl 14 is elastically deformed by the neck portion 142 being bent largely, whereby the head portion 143 is pushed to be bent towards the erected portion 141, so that the ceiling pawl 14 is allowed to pass through the opening R1. When the ceiling pawl 14 has passed through the opening R1, the ceiling pawl 14 is restored to its original condition by virtue of a restoration force of the head portion 143, whereby the ceiling pawl 14 is locked on an upper surface of the roof trim T. On the other hand, a lower side portion of the designed member 10 which includes the bezel 15 and the like is not passed through the opening R1. As a result of this, the functional member 20 and the ceiling pawl 14 come to hold the roof trim T from an upper side and the bezel 15 of the designed member 10 comes to hold the roof trim T from a lower side thereof based on the opening R1 in the roof trim T. By this configuration, the vehicle room illumination lamp 1A can be mounted easily in the opening R1 in the interior member R of the vehicle.

In contrast, in the event that the upper portion side which includes the functional member 20 and the ceiling pawl 14 of the designed member 10 is not allowed to be inserted through the opening R1 in the interior member R of the vehicle, the designed member 10 side and the functional member 20 side are temporarily disassembled as is shown in FIG. 4. As this occurs, however, the cover 30 may be kept assembled integrally to the functional member 20 as during transportation. Thereafter, only the functional member 20 side with the cover 30 kept mounted thereon is passed through the opening R1. As to the designed member 10 side, only the upper portion side, that is, only the ceiling pawl 14 is passed through the opening R1. (The size of integrally assemble of the cover 30 and the functional member 20 is smaller than the opening R1) Then, the functional member 20 and the designed member 10 are assembled together, so that the roof trim T is held by the functional member 20 and the bezel 15 of the designed member 10 therebetween.

By adopting this configuration, the vehicle room illumination lamp 1A can be mounted in the opening R1 in the interior member R on a ceiling portion of the vehicle which constitutes the mounting portion without removing the cover 30 from the functional member 20 laboriously.

Consequently, according to the embodiment, with the cover 30 kept mounted on the functional member 20, the light source 21 is protected from exterior impact by the cover 30, which is preferable for safe transportation of the vehicle room illumination lamp 1A to the mounting site. In addition, in mounting the vehicle room illumination lamp 1A on the vehicle at the mounting site, the functional member 20 can be assembled to the designed member 10 with the cover 30 kept mounted on the functional member 20, the workability at the time of assembly of the component parts being thereby enhanced.

(Second Exemplary Embodiment)

Next, a second embodiment of the invention will be described. In this embodiment, like reference numerals will be given to like portions to those of the first embodiment, so as to avoid the repetition of like descriptions.

Figure 7A:
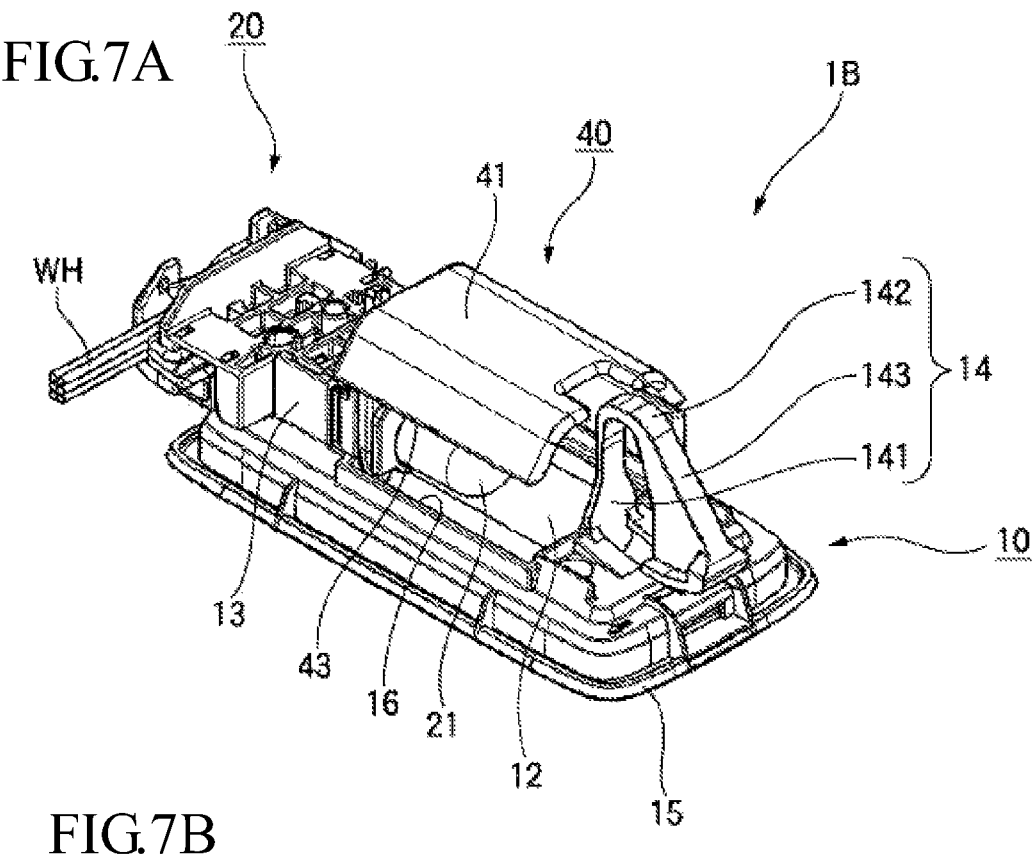
FIGS. 7A and 7B are a perspective view and a side view, respectively, which illustrate a vehicle room illumination lamp according to a second exemplary embodiment of an assembling structure.
Figure 7B:
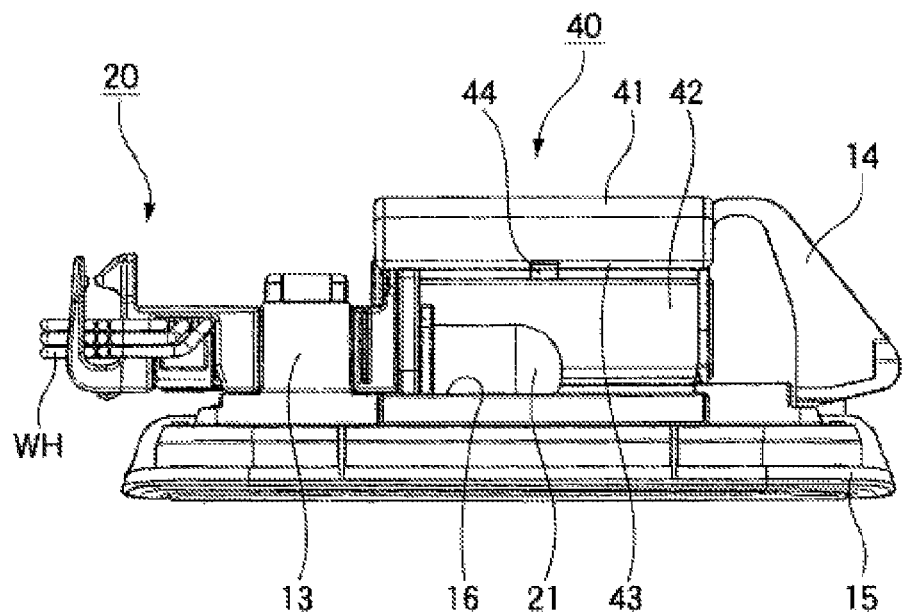
Figure 8:
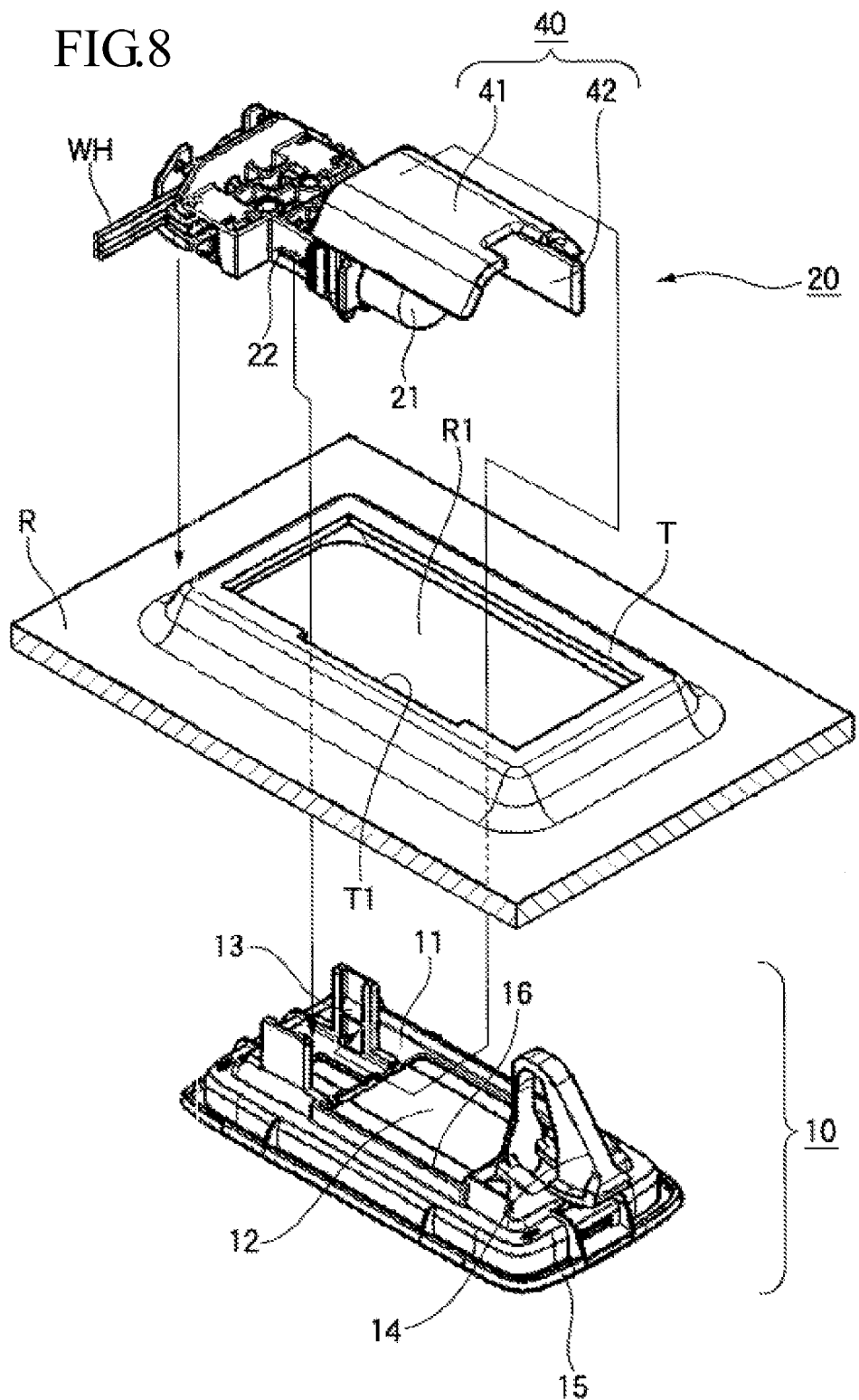
FIG. 8 is an exploded perspective view showing a condition in which the vehicle room illumination lamp is mounted in an interior member.

FIGS. 7 and 8 show a vehicle room illumination lamp 1B according to the second embodiment which is formed by applying an assembling structure for a vehicle room illumination lamp of the invention thereto. The vehicle room illumination lamp 1B differs from the vehicle room illumination lamp 1A of the first embodiment in that a cover having a cantilever construction is used in place of the cover 30.

Figure 10A:
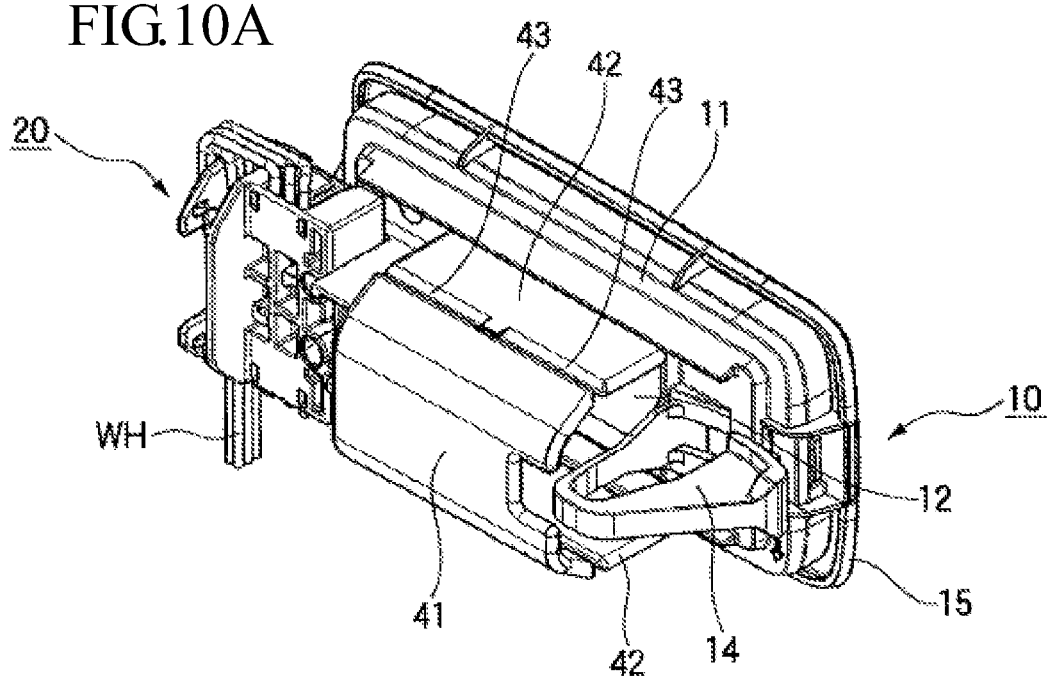
FIGS. 10A and 10B are explanatory drawings showing a method adopted when a cutout is formed by removing part of the cover.
Figure 10B:
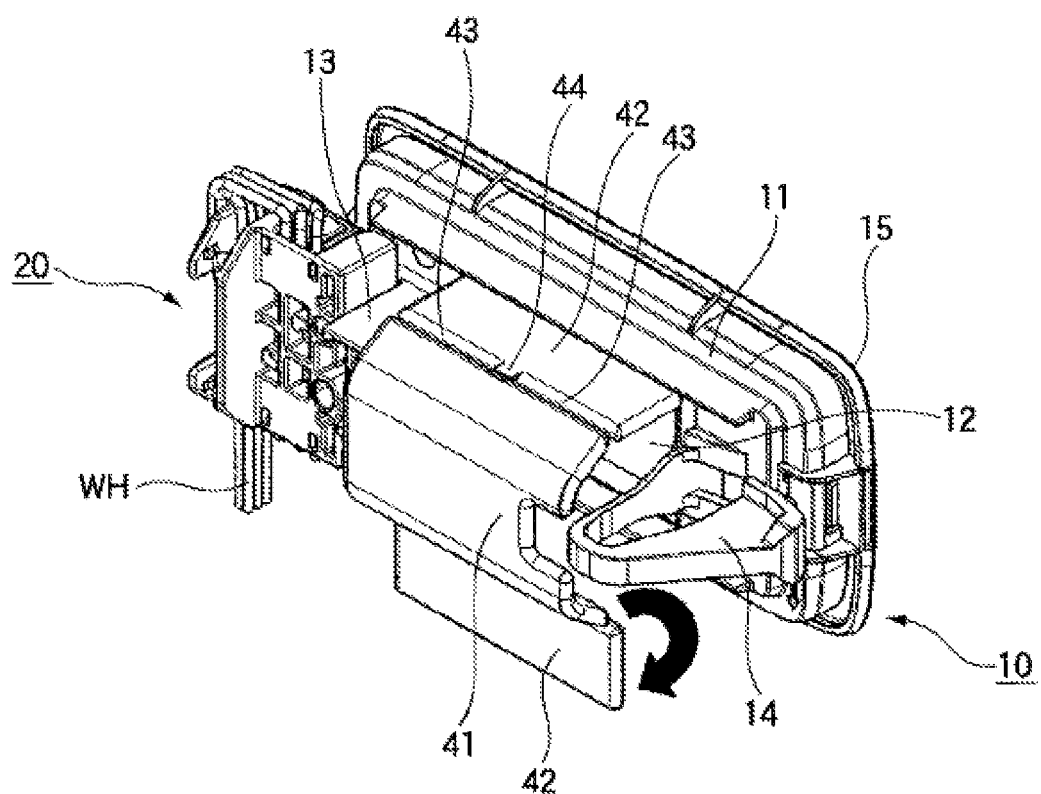
Figure 11:
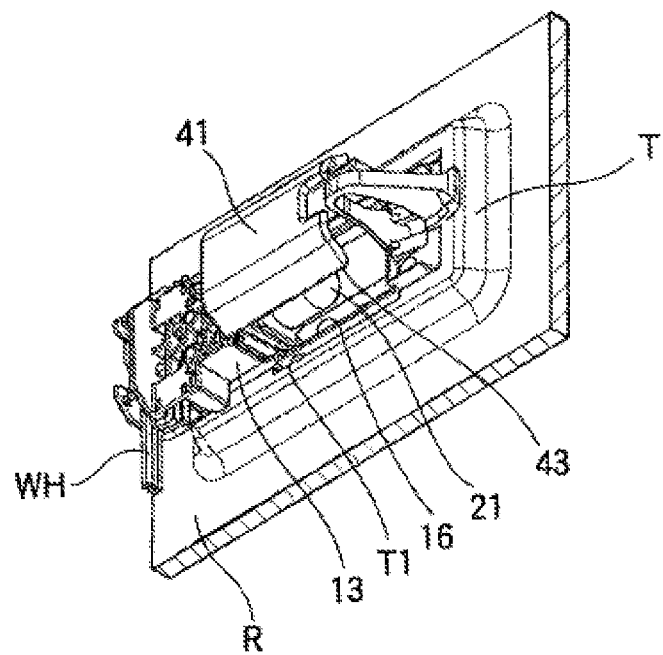
FIG. 11 is a perspective view showing a condition in which the vehicle room illumination lamp is attached to the interior member.

In this vehicle room illumination lamp 1B, in order to secure an anti-water-droplet function when the vehicle room illumination lamp 1B is mounted in an opening R1 in an interior member R, the vehicle room illumination lamp 1B is fixedly disposed not in a ceiling portion of a vehicle as where the vehicle room illumination lamp 1A of the first embodiment is disposed but in an interior member R on a vertical wall surface of a vehicle in a vertical direction (a direction in which gravity acts) in which droplets of water fall naturally. Namely, as is shown in FIGS. 10, 11, the vehicle room illumination lamp 1B is installed so as to be erected while being oriented horizontally lengthways (in a horizontally collapsed condition) relative to a floor or the like of the vehicle. Specifically, the vehicle room illumination lamp 1B is disposed so that a cutout portion (a removal portion 42 which will be described later) in a cover 40 lies on a lower side so as to prevent infiltration of droplets of water from the cutout portion.

Namely, as is shown in FIG. 9, the cover 40 is made up of a main body 41 and removable portions 42 which are separated by slits 43 and are connected to the main body 41 only by narrow connectors 44.

Of these component parts, the main body 41 includes an engagement means 45 having the same configuration as that of the first embodiment which projects from a lower portion of an end face 411 which is suspended vertically from an inner wall surface. Namely, this engagement means 45 is made up of a pair of leg portions which project downwards from an inner surface side, so as to be inserted into a mounting portion 24 of a functional member 20 from thereabove to thereby be connected thereto. The mounting portion 24 is similar to that of the first embodiment and is made up of a substantially circular fine groove which lies between two walls which rise on both sides thereof.

The removable portions 42 are connected to the main body 41 on both left- and right-hand sides thereof via the connectors 44 and can be removed from the main body 41 by cutting or bending either (or both) of the connector 44 so as to be cut apart from the main body 41. By removing the removal portion 42 in the way described above, the cover 40 can exhibit a function to protect a light source 21 from dust and droplets of water and a function to protect the light source 21 during transportation, in addition to a function as a reflector. At the same time, a risk can be eliminated of the cover 40 being fused by heat generated and radiated from the light source 21.

In the event that the cover 40 (the main body 41) is given the function to protect the light source from dust and droplets of water, the portion resulting when the removal portion 42 is removed from the main body 41 must of course be oriented downwards, that is, the vehicle interior illumination light 1B must be arranged in the way shown in FIG. 10.

As has been described above, the connector 44 has the narrow shape which is defined between the left and right elongated slits 43. The connector 44 is not limited to one which is made up of the narrow connector between the slits 43 but may be made up of grooves which are provided intermittently into a series of dots so as to be cut along the grooves.

Next, there will be described a preliminary assembling method of the vehicle room illumination lamp 1B according to the embodiment prior to transportation and an assembling method of assembling the same illumination lamp in the opening R1 in the interior member R of the vehicle after arrival at an assembly site.

(I) Preliminary Assembly for Transportation:

FIG. 9 shows assembling work carried out at the time of loading for transportation. Although the functional member 20 will be described as being assembled to the designed member 10 in advance, the cover 40 may be assembled to the functional member 20 in advance.

Figure 9A:
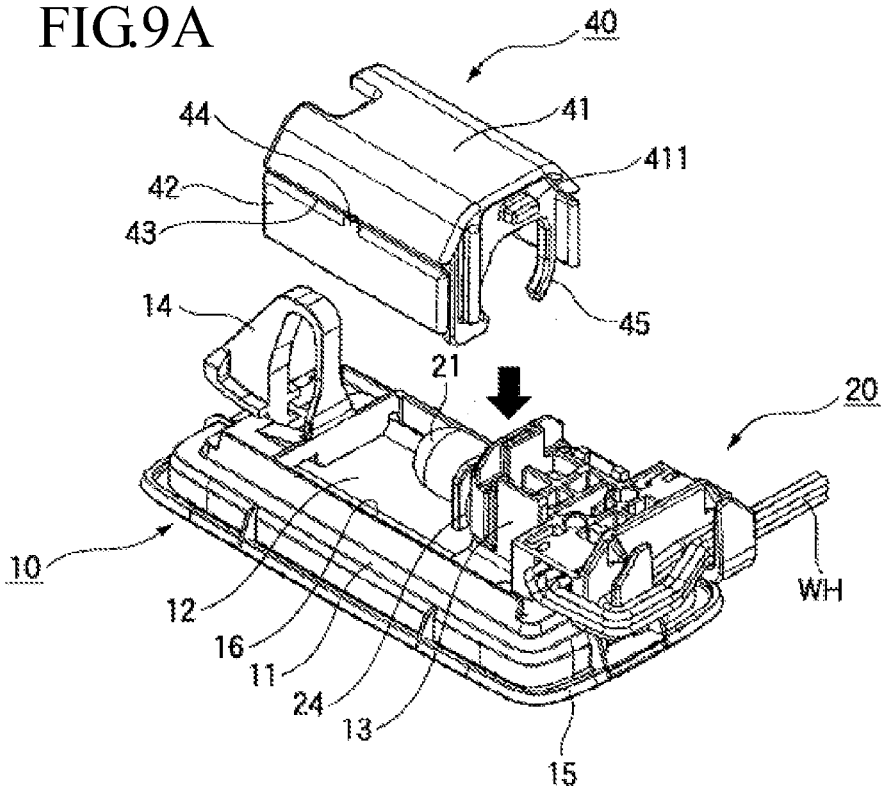
FIGS. 9A and 9B are a perspective view and a side view, respectively, which illustrate a condition in which a cover is assembled with a designed member of the vehicle room illumination lamp.
Figure 9B:
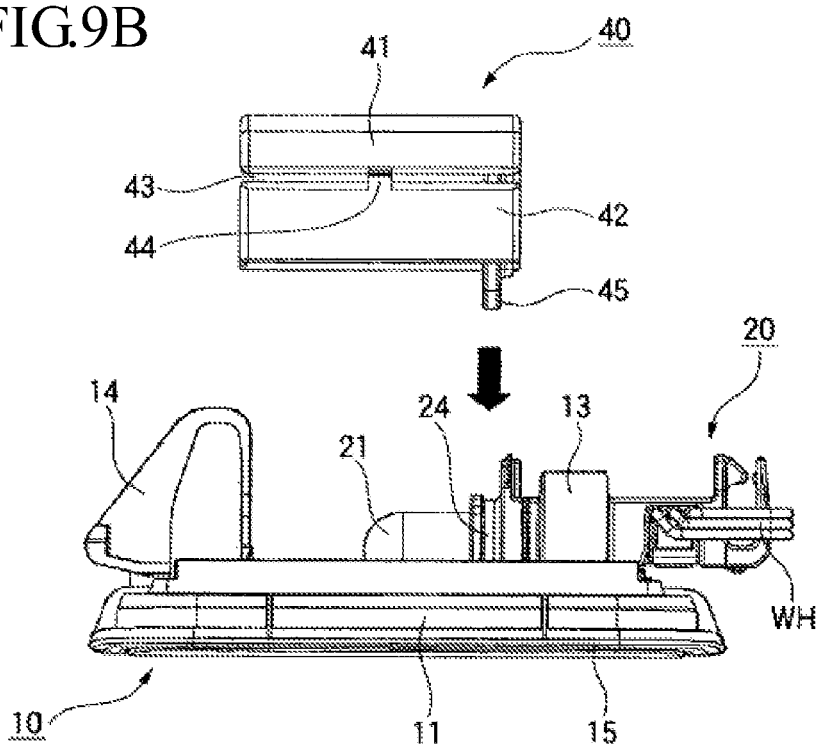

When the functional member 20 is assembled to the designed member 10, similarly to the first embodiment, lock pawls 22 of the functional member 20 are fastened to a lock 13 of the designed member 10 so that the lock pawls 22 are locked on the lock 13 (refer to FIG. 8). Thereafter, although the cover 40 is assembled to the functional member 20, as is shown in FIGS. 9A, 9B, an assembling method is totally the same as the method used in the first embodiment. By this action, the vehicle room illumination lamp 1B is built up in such a condition shown in FIG. 7. In this embodiment, too, when the component parts are assembled together into the condition so shown, the light source 21 is protected from exterior impact by the cover 40, and the vehicle room illumination lamp 1B is in a preferable condition for transport to the mounting site.

(II) Assembly to Vehicle after Arrival at Vehicle Assembly Site:

In this case, the vehicle room illumination lamp 1B can easily be mounted in the opening R1 in the interior member R of the vehicle following a completely similar working procedure to that used in the first embodiment. Namely, the vehicle room illumination lamp 1B can be mounted in the opening R1 in such a condition that the same illumination lamp 1B is built up as is shown in FIG. 7. By this configuration, the vehicle room illumination lamp 1B can easily be mounted in the opening R1 in the interior member R of the vehicle.

In contrast, in the event that an upper portion side which includes the functional member 20 and a ceiling pawl 14 of the designed member 10 is not allowed to be inserted through the opening R1 in the interior member R of the vehicle, the designed member 10 side and the functional member 20 side are temporarily disassembled, as is shown in FIG. 8. As this occurs, similarly to the first embodiment, the cover 40 may be kept assembled integrally to the functional member 20 as during transportation.

By adopting this configuration, the vehicle room illumination lamp 1B can be mounted in the opening R1 in the interior member R on a ceiling portion of the vehicle which constitutes the mounting portion without removing the cover 40 from the functional member 20 laboriously.

Consequently, according to the embodiment, similarly to the first embodiment, with the cover 40 kept mounted on the functional member 20, the light source 21 is protected from exterior impact by the cover 40, which is preferable for safe transportation of the vehicle room illumination lamp 1B to the mounting site. In addition, in mounting the vehicle room illumination lamp 1B on the vehicle at the mounting site, similarly to the first embodiment, the functional member 20 can be assembled to the designed member 10 with the cover 40 kept mounted on the functional member 20, the workability at the time of assembly of the component parts being thereby enhanced.

According to the embodiment, even in the event that much heat is radiated from the light source 21 by the light source 21 being kept illuminated for a long period of time, since the cover 40 is in the cantilever condition as is shown in FIG. 11, a high heat dissipating capability is ensured. In other words, since heat radiated from the light source 21 can be dissipated effectively from the opened portion in the cover 40 which is produced by removing one of the removable portions 42 of the cover 40, there is caused no such situation that an interior of a space surrounded by the cover 40 is heated, whereby damage resulting from burning can be prevented, so as to realize safety at a high level.

(Third Exemplary Embodiment)

Next, a third embodiment of the invention will be described. In this embodiment, like reference numerals will be given to like portions to those of the first embodiment and the second embodiment, so as to avoid the repetition of like descriptions.

Figure 12A:
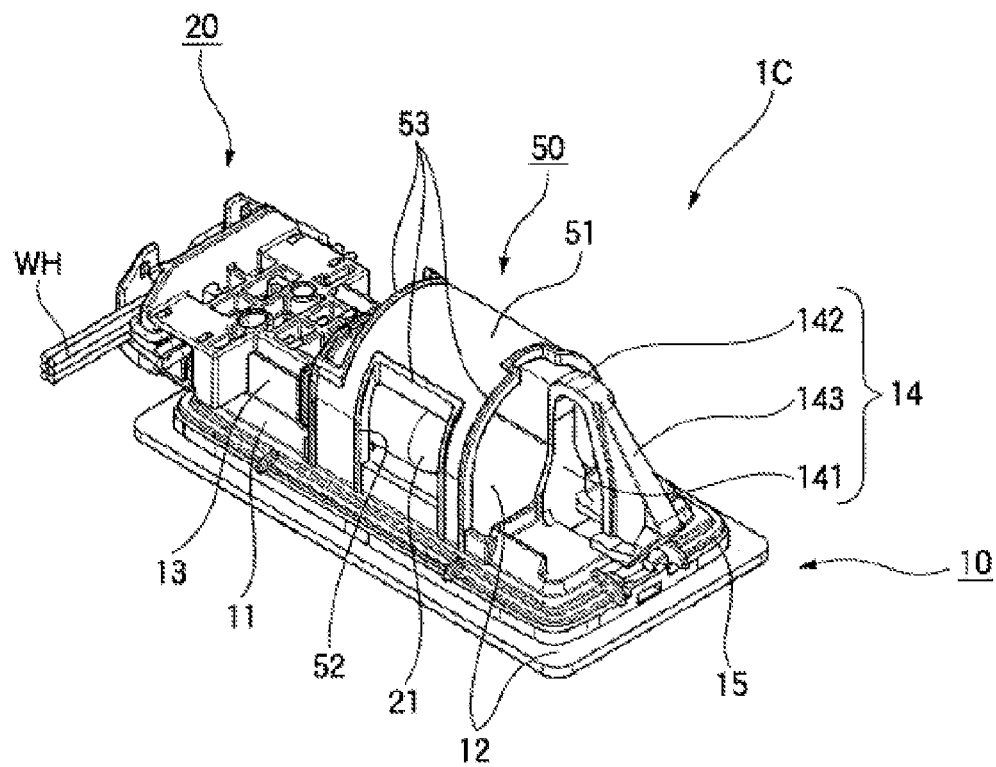
FIGS. 12A and 12B are a perspective view and a side view, respectively, which illustrate a vehicle room illumination lamp according to a third exemplary embodiment of an assembling structure.
Figure 12B:
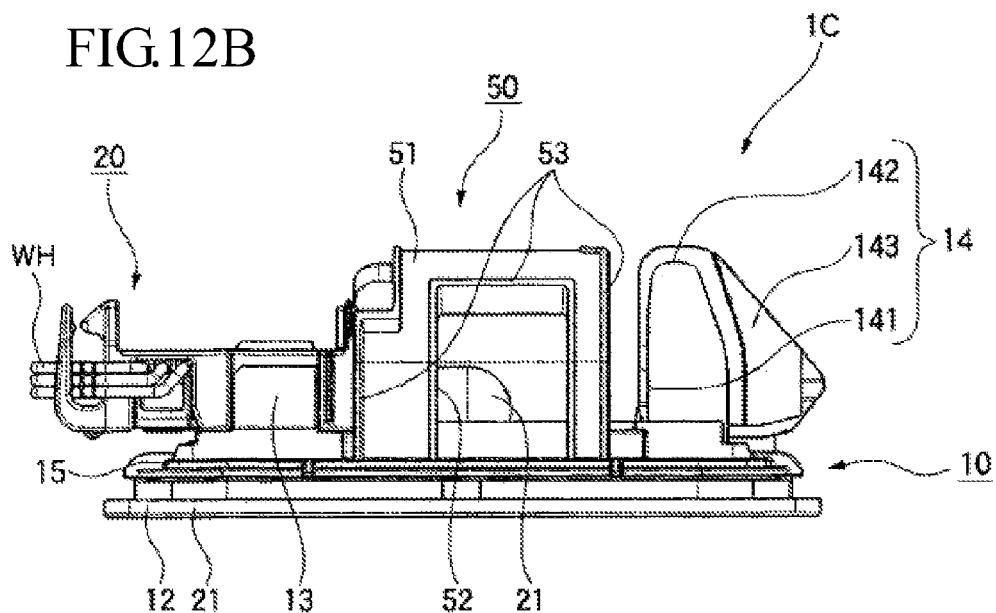
Figure 13:
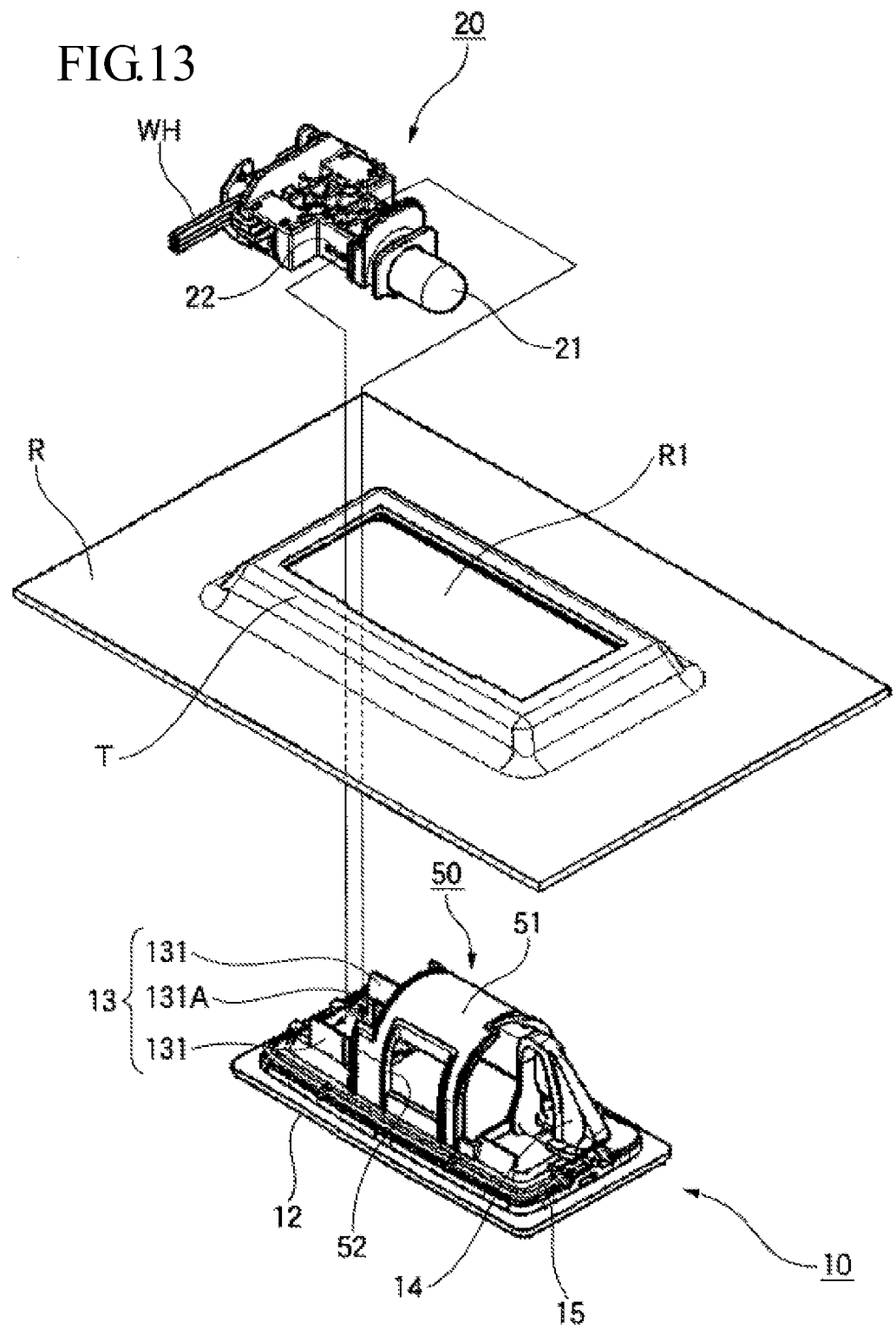
FIG. 13 is an exploded perspective view showing a condition in which the vehicle room illumination lamp is attached to an interior member.
Figure 14A:
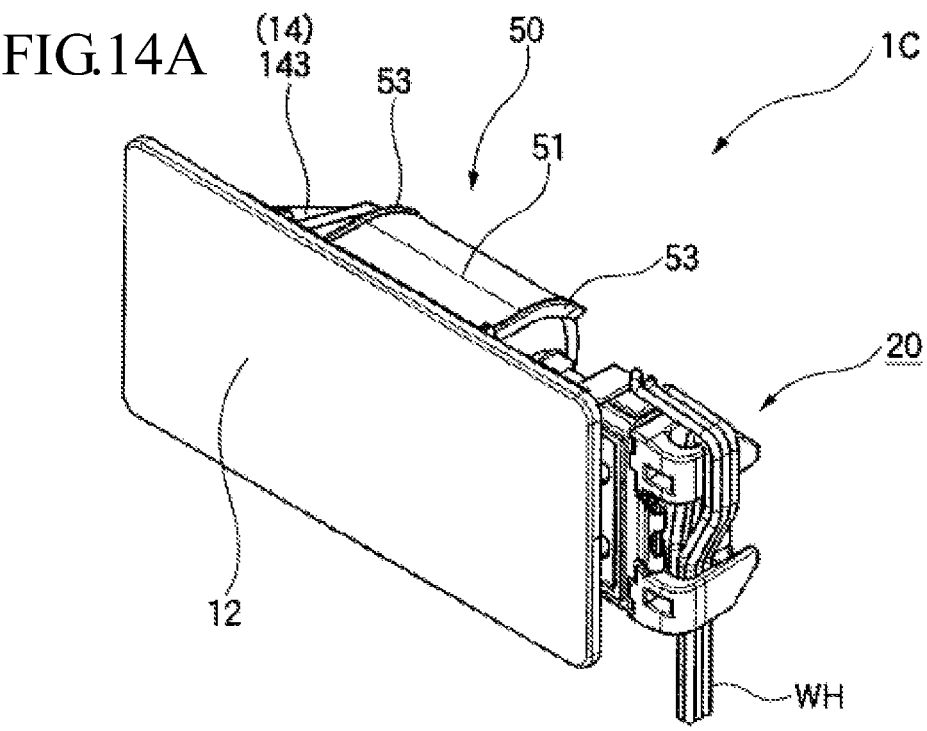
FIGS. 14A and 14B are perspective views showing front and rear postures of the vehicle room illumination lamp when the same lamp is attached to the interior member.

FIGS. 12 to 14 show a vehicle room illumination lamp 1C according to the third embodiment which is formed by applying an assembling structure for a vehicle room illumination lamp of the invention thereto. The vehicle room illumination lamp 1C differs from the vehicle room illumination lamp 1B of the second embodiment in that either of left- and right-hand side portions of a main body 51 of a cover 50 is cut out in advance to form a cutout portion 52 where a function as a heat dissipating port (or a ventilation port) is given to the main body 51 in fabricating the cover 50.

In this embodiment, too, in order to provide an anti-water-droplet function for preference in addition to a heat dissipating function, the vehicle room illumination lamp 1C is fixedly disposed not in a ceiling portion of a vehicle as in the first embodiment but in an interior member R on a vertical wall surface of a vehicle (in a vertical direction (a direction in which gravity acts) in which droplets of water fall naturally). Namely, as in the first embodiment, also in the vehicle room illumination lamp 1C, a housing 11 is disposed so as to be erected relative to a floor or the like of the vehicle. Specifically, the vehicle room illumination lamp 1C is disposed so that an opening in the cover 50 which is formed by partially cutting out the cover 50 lies on a lower side so as to prevent infiltration of droplets of water from the cut-out opening.

Figure 15:
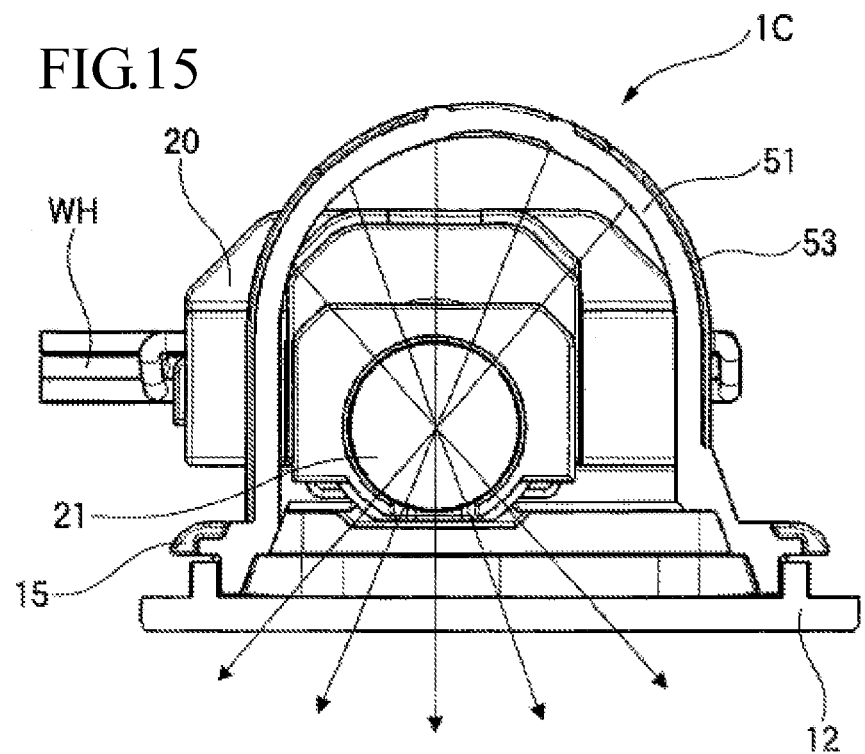
FIG. 15 is an explanatory drawing showing a condition in which illumination light is reflected by a cover of the vehicle room illumination lamp.

The main body 51 differs from the main body 41 of the second embodiment which is formed into the polygonal shape by providing corners and has a curved surface which is curved into a smooth curve without any corner. In particular, an inner wall surface of this main body 51 is, as is shown in FIG. 15, is formed of a material containing a high reflective material so as to enhance a function as a reflection plate (a reflector) so that in light emitted from a light source 21, light directed towards the inner wall surface of the main body 51 is reflected with a high reflectance factor and is directed in a direction in which a lens 12 resides. Similarly, the covers of the other embodiments than this embodiment can be formed of the same material so as to be given the same high reflecting function. Further, the covers of the respective embodiments including this embodiment may be formed of a material containing a diffusing material to reduce the reflectance factor, so that the brightness of illumination light from the light source 21 can be adjusted as required.

Projecting portions 53, which project in a rib-like fashion, are provided on outer circumferential edge portions of the main body 51 and inner circumferential edge portions which surround a cutout portion 52 so as to prevent condensed moisture or droplets of water from infiltrating an interior space surrounded by the main body 51 from the outer circumferential edge portions of the main body 51 and the inner circumferential edge portions of the cutout portion 52 even in case condensed moisture or droplets of water adhere to an outer surface of the main body 51.

Figure 14B:
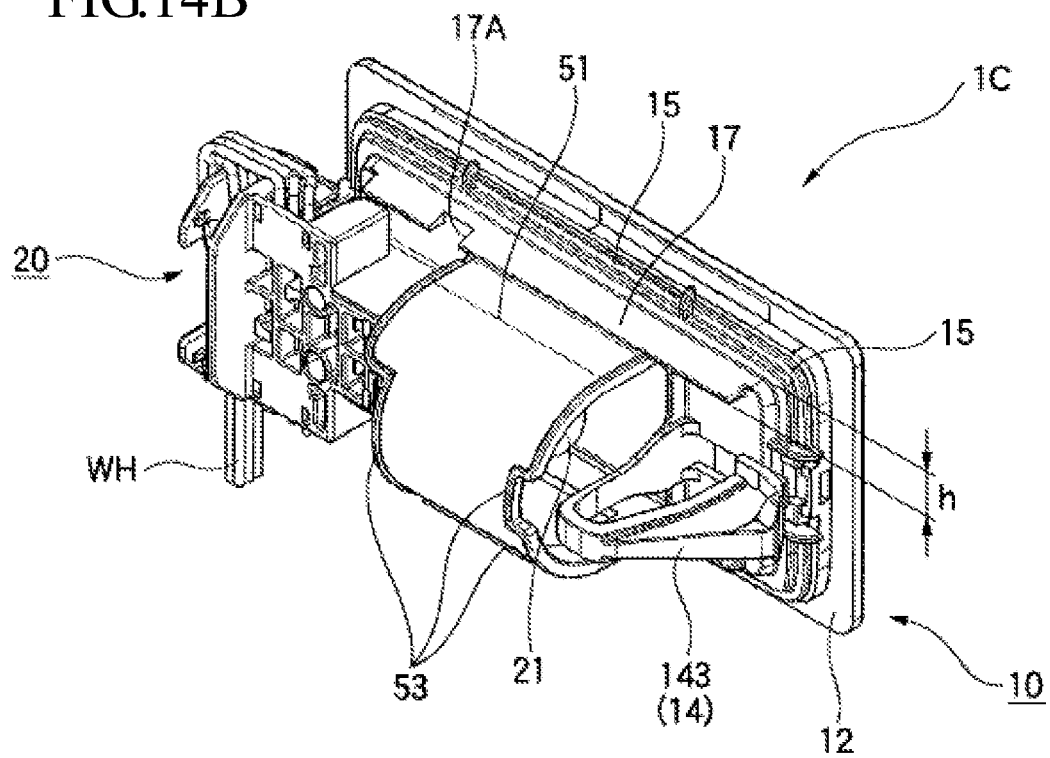

Further, as is shown in FIG. 14B, a water barrier wall 17 having a height h relative to a housing 11 of a designed member 10 is erected from the housing 11 in a position between a bezel 15 and the cover 50.

In order to provide the anti-water-droplet function for preference as described previously, when the housing 11 is disposed in the vertical direction which is erected relative to the floor of the vehicle as is shown in FIG. 14B, the water barrier wall 17 is designed to be disposed on an upper side in the vertical direction. In addition, a groove 17A is formed in the water barrier wall 17 so as to allow condensed moisture or droplets of water to escape downwards therefrom so as to eliminate a risk of such condensed moisture or droplets of water being accumulated at an upper portion of the water barrier wall 17 even in case condensed moisture or droplets of water are produced.

Next, there will be described a preliminary assembling method of the vehicle room illumination lamp 1C according to the embodiment prior to transportation and an assembling method of assembling the same illumination lamp in an opening R1 in the interior member R of the vehicle after arrival at an assembly site.

(I) Preliminary Assembly for Transportation:

FIG. 12 shows assembling work carried out at the time of loading for transportation. In this case, similarly to the first and second embodiments, the functional member 20 may be assembled to the designed member 10 in advance, or the cover 50 may be assembled to the functional member 20 in advance.

In this embodiment, too, a means for assembling the functional member 20 on to the designed member 10 and a means for assembling the cover 50 on to the functional member 20 are the same as those of the first and second embodiments. In this embodiment, too, since the light source 21 is protected from exterior impact by the cover 50, the vehicle room illumination lamp 1C is preferable for transportation to the mounting site.

(II) Assembly to Vehicle after Arrival at Vehicle Assembly Site:

In this case, too, the vehicle room illumination lamp 1C can be mounted in the opening R1 in the interior member R of the vehicle following a completely similar working procedure to that used in the first and second embodiments.

In this way, in this embodiment, too, the vehicle room illumination lamp 1C can be fixedly mounted in the opening R1 in the interior member R on a ceiling portion of the vehicle which constitutes a mounting portion without removing the cover 50 from the functional member 20 laboriously.

Consequently, according to the vehicle room illumination lamp 1C of the embodiment, similarly to the first embodiment, with the cover 50 kept mounted on the functional member 20, the light source 21 is protected from exterior impact by the cover 50, which is preferable for safe transportation of the vehicle room illumination lamp 1C to the mounting site. In addition, in mounting the vehicle room illumination lamp 1C on the vehicle at the mounting site, similarly to the first embodiment, the functional member 20 can be assembled to the designed member 10 with the cover 50 kept mounted on the functional member 20, the workability at the time of assembly of the component parts being thereby enhanced.

Figure 16:
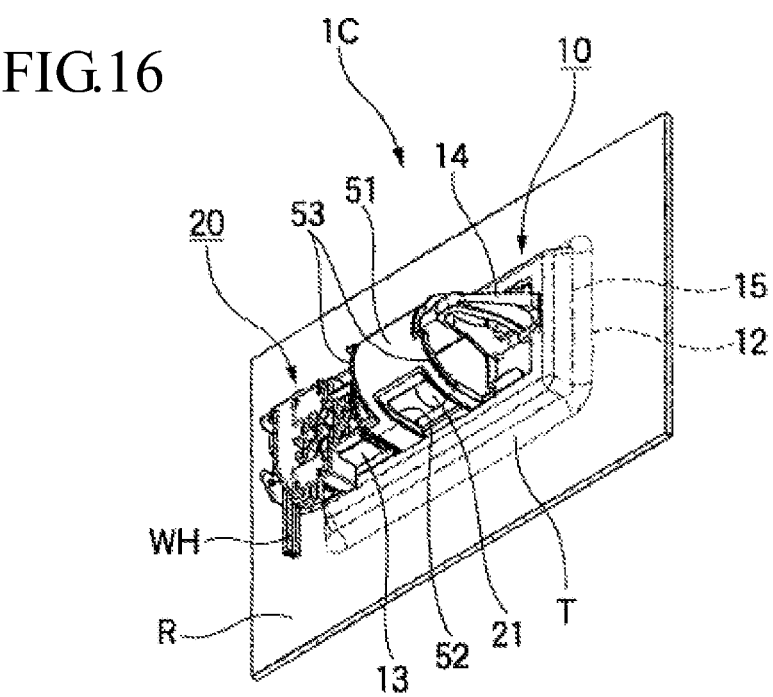
FIG. 16 is a perspective view showing a condition in which the vehicle room illumination lamp has been mounted in the interior member.

According to the embodiment, similarly to the vehicle room illumination lamp 1B of the second embodiment, even in the event that much heat is radiated from the light source 21 by the light source 21 being kept illuminated for a long period of time, the cutout portion 52 is formed to be opened in one side of the cover 50 as is shown in FIGS. 12 and 16. In other words, by providing the cutout portion 52 by partially cutting out one of both side surfaces of the cover, heat radiated from the light source 21 can be dissipated effectively from the cutout portion 52 which is an opening in the cover 50, and therefore, there is caused no such situation that an interior of a space surrounded by the cover 50 is heated, whereby damage to the cover 50 resulting from burning can be prevented, so as to realize safety at a high level.

Further, according to the embodiment, even in case condensed moisture or droplets of water are produced in the respective portions, such condensed moisture or droplets of water are prevented from infiltrating the interior of the housing 11 by the water barrier wall 17 which is installed to be disposed on the upper side in the vertical direction of the housing 11 and the projecting portions 53 which are provided along the outer circumferential edge portions of the cover 50 and the inner circumferential edge portions which face the cutout portion 52. In addition, even in case the condensed moisture or droplets of water are allowed to infiltrate the main body 51 of the cover 50, since the cutout portion 52 is provided in the main body 51 of the cover 50, there is caused no such situation that condensed moisture or droplets of water are started to be accumulated on the main body 51 of the cover 50. Even in case condensed moisture or droplets of water come to flow to an upper portion of the water barrier wall 17, as is shown in FIG. 14B, the groove 17A in the water barrier wall 17 allows the moisture or droplets of water to escape downwards therefrom, thereby making it possible to avoid such a situation that condensed moisture or droplets of water are started to be accumulated on the water barrier wall 17.

(Fourth Exemplary Embodiment)

Next, a fourth embodiment of the invention will be described. In this embodiment, like reference numerals will be given to like portions to those of the first to third embodiments, so as to avoid the repetition of like descriptions.

Figure 19:
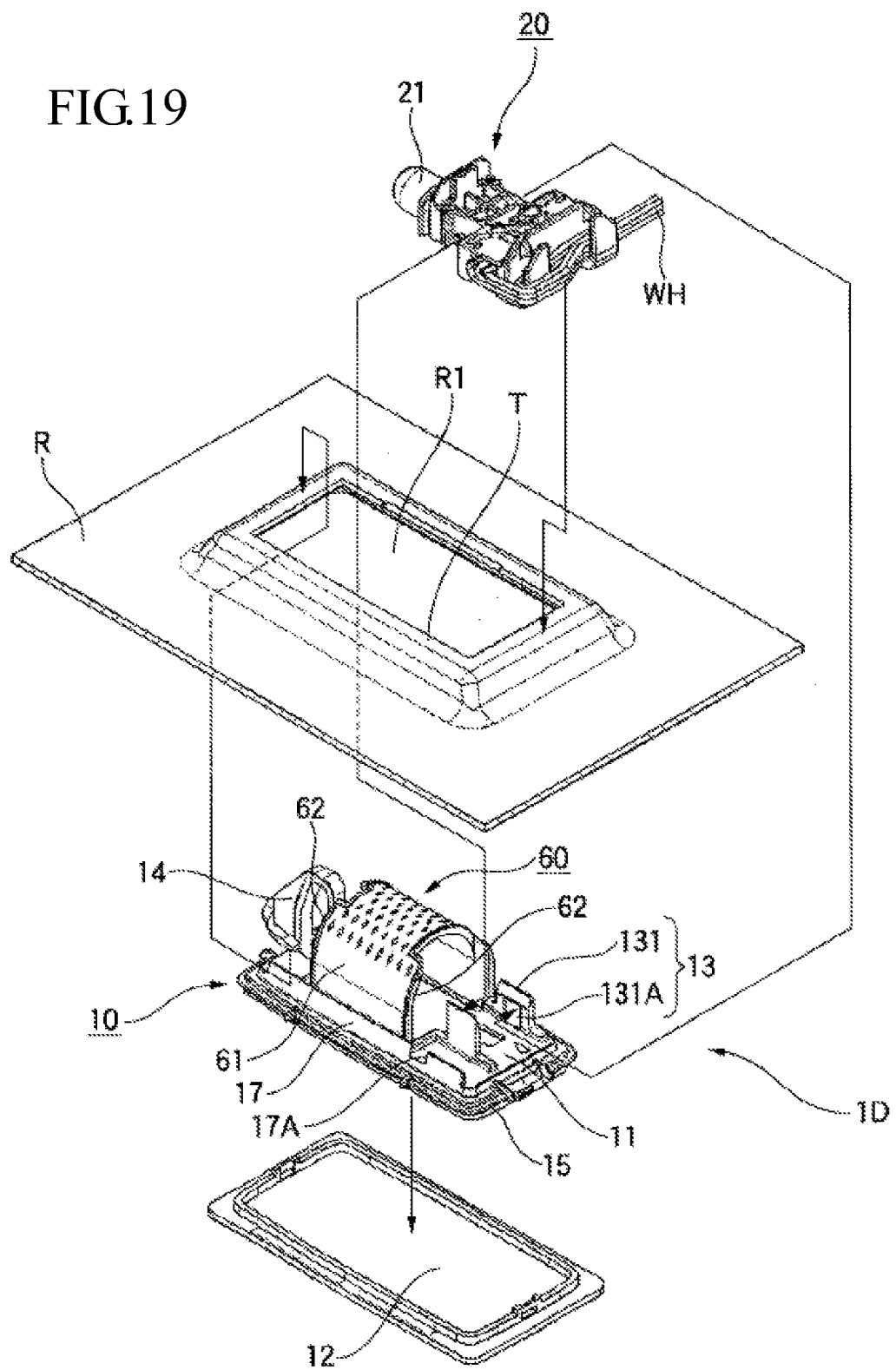
FIG. 19 is an exploded perspective view showing a condition in which the vehicle room illumination lamp is attached to an interior member.

FIGS. 17 to 19 show a vehicle room illumination lamp 1D according to the fourth embodiment which is formed by applying an assembling structure for a vehicle room illumination lamp of the invention thereto. The vehicle room illumination lamp 1D differs from the vehicle room illumination lamp 1C of the third embodiment in that in place of forming the cutout portion by cutting out either of the left- and right-hand side portions of the main body in advance, a plurality (a large number) of vent holes 61A are formed in an outer circumferential surface of a main body 61 of a cover 60 as heat dissipating means (or ventilation means) for allowing air in an interior of the cover main body 61 to escape therefrom and that projecting portions 62 which are similar to the projecting portions 53 of the third embodiment are formed on outer circumferential edge portions of the main body 61.

Figure 20A:
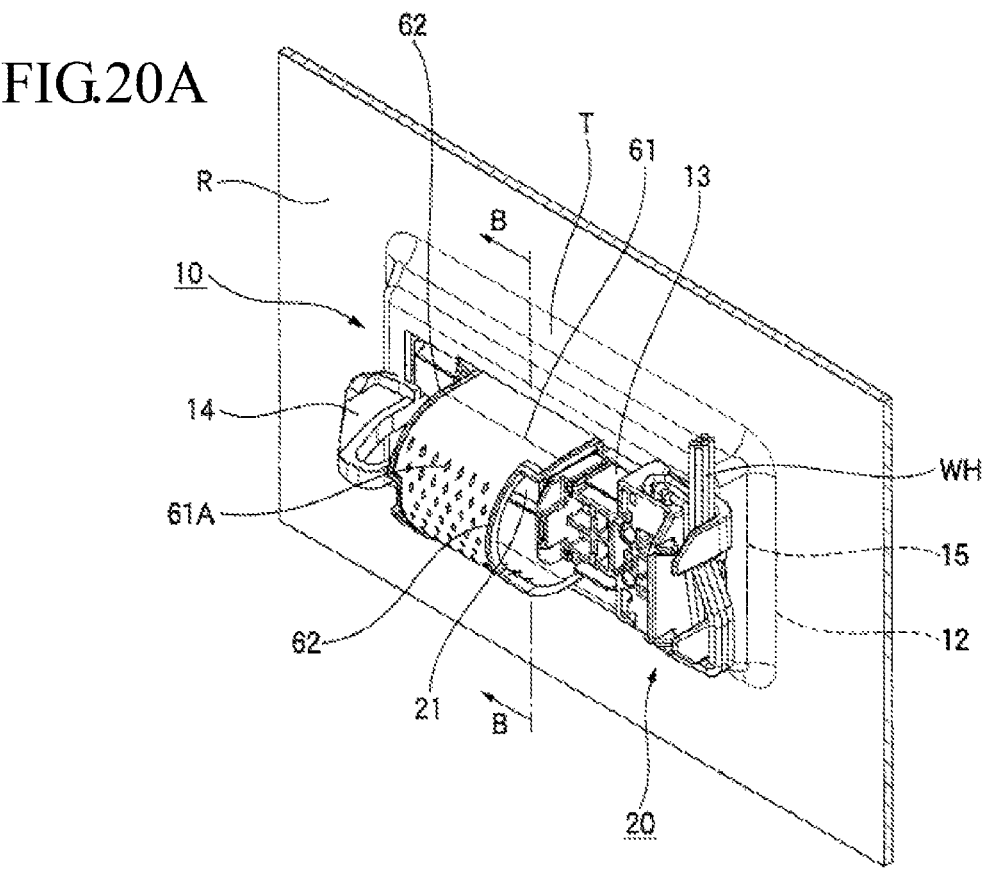
FIG. 20A is a perspective view showing a condition in which the vehicle room illumination lamp has been attached to in the interior member.
Figure 20B:
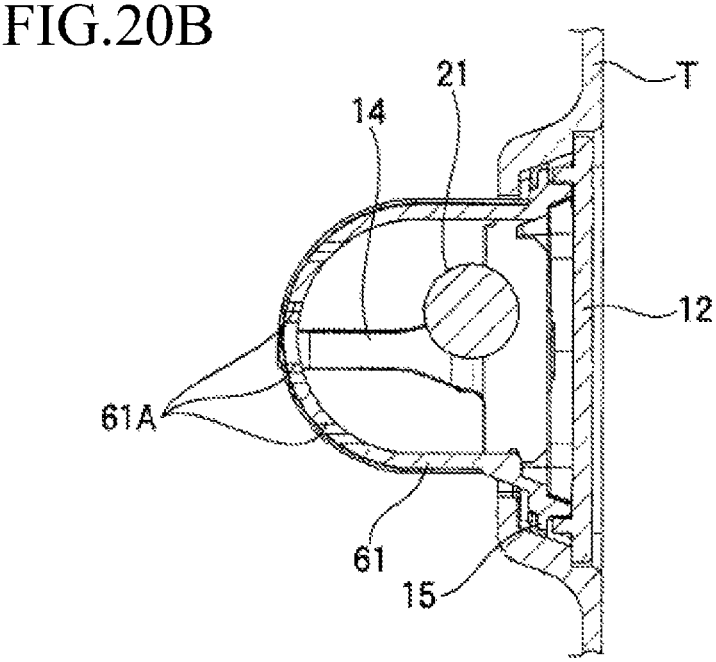
FIG. 20B is a sectional view taken along the line B-B in FIG. 20A.
Figure 21:
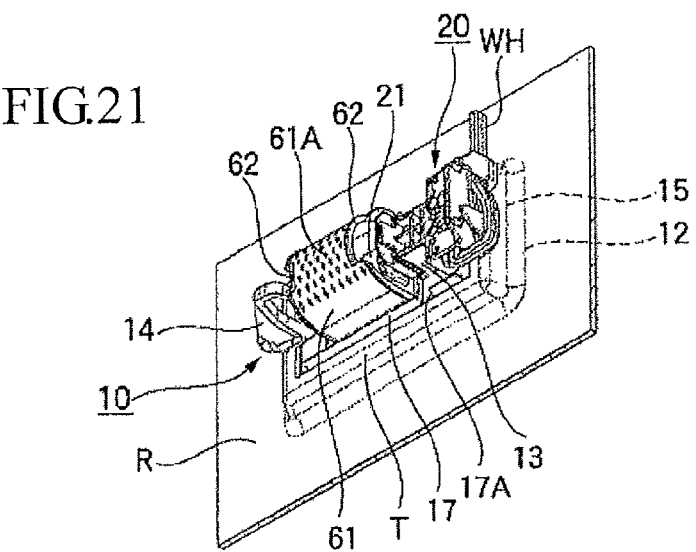
FIG. 21 is a perspective view showing a condition in which the vehicle room illumination lamp attached to the interior member is viewed from therebelow.
Figure 22:
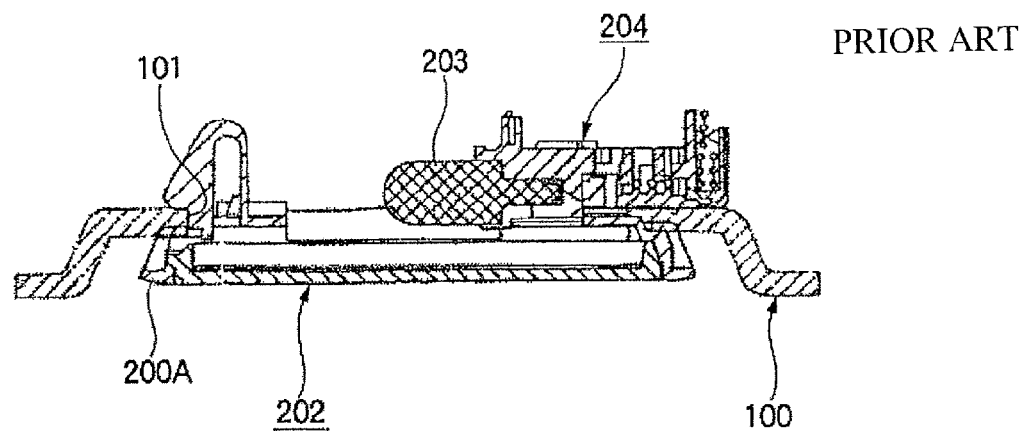
FIG. 22 is a sectional view showing a conventional room illumination lamp.
Figure 23A:
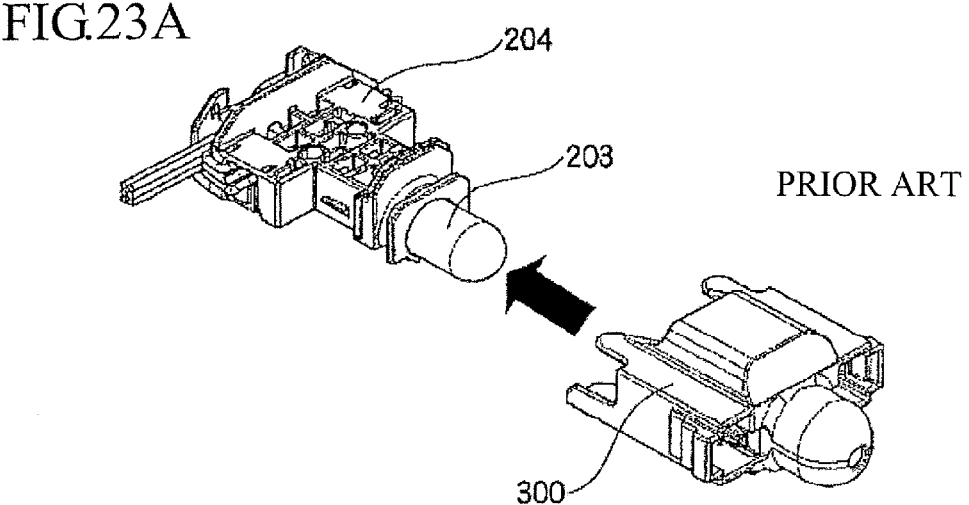
FIGS. 23A and 23B are explanatory drawings showing a condition before a light source protection cover is assembled with a functional member when the room illumination lamp is transported (A) and after the light source protection cover has been assembled with the functional member (B).
Figure 23B:
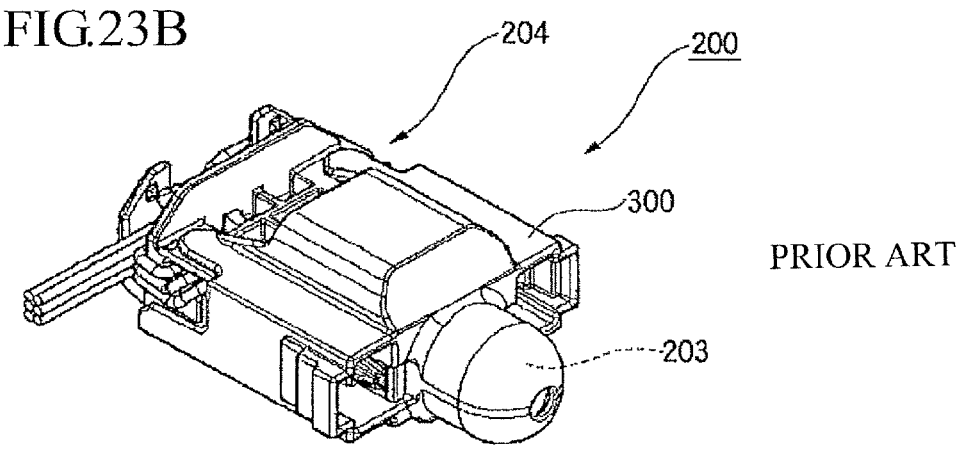

In the vehicle room illumination lamp 1D of this embodiment, too, an anti-water-droplet function is provided together with a function to protect a light source 21 during transportation and a heat dissipating function for dissipating heat generated from the light source 21 when it is illuminated. Because of this, although those functions can be obtained to some extent when the vehicle room illumination lamp 1D is installed in a ceiling portion of a vehicle as in the first embodiment, in order to obtain those functions at higher levels, as in the second and third embodiments, the vehicle room illumination lamp 1D is fixedly disposed in an interior member R on a vertical wall surface of the vehicle (in a vertical direction in which droplets of water fall naturally by the action of gravity), as is shown in FIGS. 20 and 21.

Namely, also in the vehicle room illumination lamp 1D of this embodiment, a housing 11 is disposed so as to be erected relative to a floor or the like of the vehicle as in the second and third embodiment. However, since no opening which is cut out largely is formed particularly in the cover 60, the installed orientation of the vehicle room illumination lamp 1D is not limited to the vertical direction in disposing the same illumination lamp.

The ventilation holes 61A are provided as a substitute for the openings which are provided in the second and third embodiments and prevent, similarly to the second and third embodiments, a failure or damage to the light source 21 due to condensed moisture or droplets of water produced on the vehicle side or dust.

As is shown in FIG. 18, the vent holes 61A of the embodiment are made up of a plurality of holes which are provided on a certain regular basis and have a construction which makes it difficult for droplets of water to pass therethrough. Namely, in these vent holes 61A, for example, an opening edge portion of the vent hole 61A is shaped to rise slightly from an inner surface to an outer surface of the main body 61 of the cover 60, whereby even in case droplets of water adhere to the outer surface of the main body 61, those droplets of water can be prevented from infiltrating an interior of the vent hole 61A from the rising edge portion of the hole 61A. In addition, by adopting this configuration, droplets of water can also be prevented from infiltrating the hole 61A by the action of surface tension of the droplets of water.

An assembling method of the vehicle room illumination lamp 1D according to the embodiment for transportation and an assembling method of the same illumination lamp in an opening R1 in an interior member R of a vehicle after arrival at the assembly site can be carried out in a procedure totally similar to that of the third embodiment.

Consequently, when assembling the component parts of the vehicle room illumination lamp 1D for transportation, in this embodiment, too, since the light source 21 is protected from exterior impact by the cover 60, the assembling structure of the embodiment is preferable for transportation of the vehicle room illumination lamp 1D to the mounting site.

Also, when the vehicle interior illumination lamp 1D is mounted on a vehicle after arrival at the assembly site, the vehicle interior illumination lamp 1D can be mounted in an opening R1 in an interior member R of a vehicle following the totally similar working procedure to those used in the first and second embodiments.

In this way, in this embodiment, too, the vehicle room illumination lamp 1D can be mounted in the opening R1 in the interior member R of the vehicle which constitutes a mounting portion without removing the cover 60 from the functional member 20 laboriously.

Consequently, according to this embodiment, similarly to the first embodiment, with the cover 60 kept mounted on the functional member 20, since the light source is protected from exterior impact by the cover 60, this configuration is preferable for safe transportation of the vehicle room illumination lamp 1D to the mounting site. In addition, also when mounting the vehicle room illumination lamp 1D on the vehicle at the mounting site, similarly to the first embodiment, the functional member 20 can be assembled on to a designed member 10 with the cover 60 kept mounted on the functional member 20, the workability at the time of assembly of the component parts being thereby enhanced.

According to the embodiment, similarly to the vehicle room illumination lamps 1B, 1C of the second and third embodiments, even in the event that much heat is radiated from the light source 21 by the light source 21 being kept illuminated for a long period of time, the vent holes 61A are formed in the cover 60 as is shown in FIG. 18. In other words, since heat radiated from the light source 21 can be dissipated effectively from the vent holes 61A which are open hole portions provided on substantially the full circumference of the cover 60, there is caused no such situation that an interior of a space surrounded by the cover 60 is heated, whereby damage to the cover 60 resulting from burning can be prevented, so as to realize safety at a high level.

Further, according to the embodiment, even in case condensed moisture or droplets of water are produced at an exterior portion of the cover 60, such condensed moisture or droplets of water are interrupted by the water barrier wall 17 which is installed to be disposed on the upper side in the vertical direction of the housing 11 and the projecting portions 62 which are provided along the outer circumferential edge portions of the main body 61, so that the condensed moisture or droplets of water are prevented from infiltrating the interior of the housing 11. In addition, even in case such condensed moisture or droplets of water come to flow out to an upper portion of the water barrier wall 17, the condensed moisture or droplets of water are allowed to escape downwards from a groove 17A formed in the water barrier wall 17 as is shown in FIG. 14B, thereby making it possible to avoid a risk of the condensed moisture or droplets of water starting to be accumulated at the upper portion of the water barrier wall 17.

According to the embodiment, since the vent holes 61A of the embodiment are made up of the plurality of holes which are provided on the certain regular basis as is shown in FIG. 18, there can be provided another advantage that light from the light source can be reflected substantially uniformly.

(Fifth Exemplary Embodiment; Added)

The fifth exemplary embodiment of the present invention is explained below with reference to FIG. 24 to FIG. 35.

Figure 24:
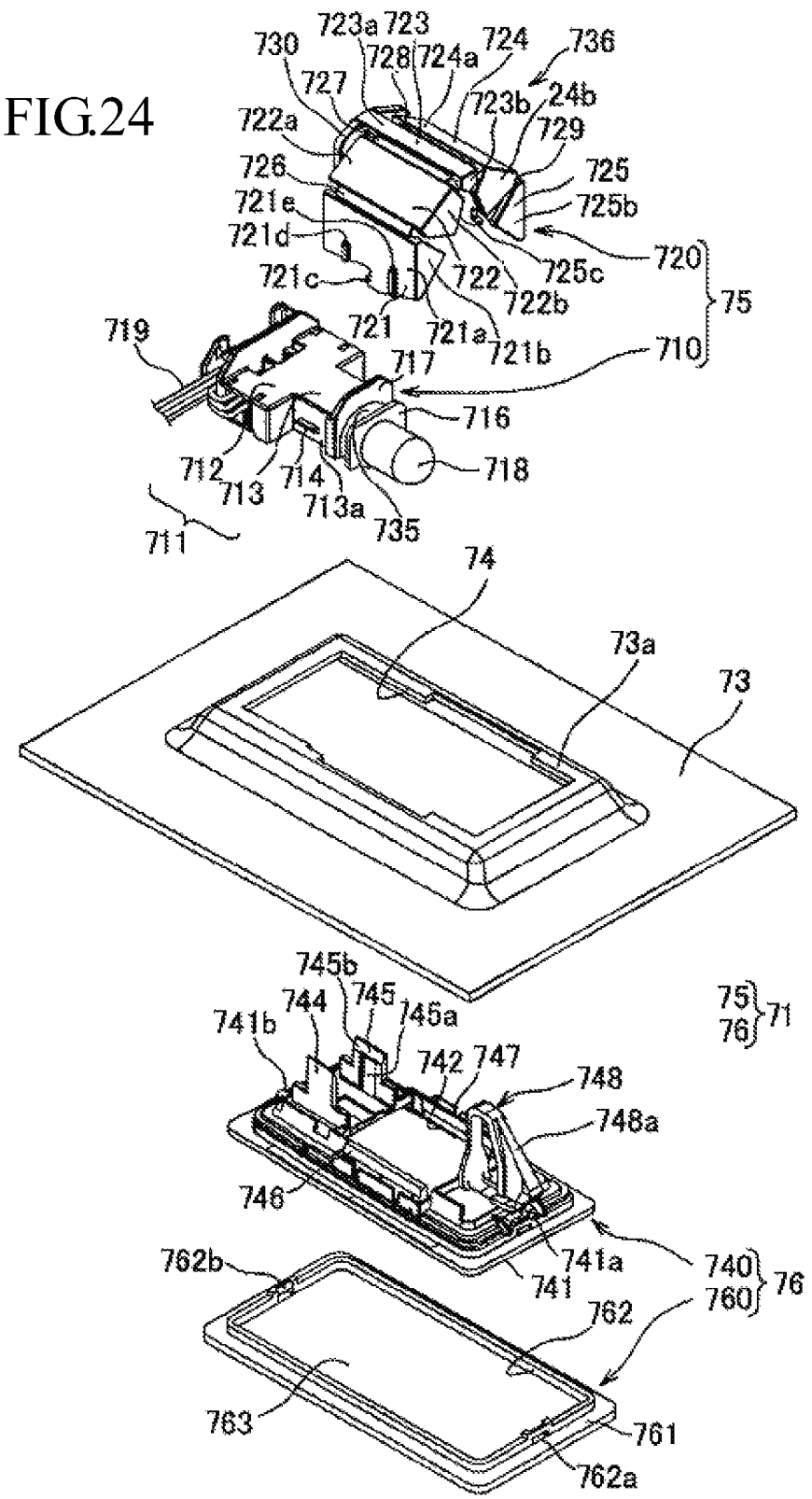
FIG. 24 is an exploded perspective view of a lamp unit according to the fifth exemplary embodiment a vehicle room illumination lamp which includes such a lamp unit.

A lamp unit (indicated by symbol 75 in the drawing), as shown in FIG. 24, constitutes an indoor illumination lamp 1 in such a manner that the lamp unit 75 is mounted on an trim 73a having an opening 74 which is formed on a ceiling 73 which constitutes an interior wall surface of a vehicle together with an designed member 76. Further, the lamp unit 75 may be directly mounted on the ceiling 73 without interposing the designed member 76 therebetween.

The lamp unit 75, as shown in the respective drawings, includes a functional member 710 and a light source protective member 720.

The functional member 710 includes a light source driver 711 and a light source 718. The light source driver 711 is, for example, made of a synthetic resin or the like and is formed into a box shape having an approximately T shape as viewed in a plan view consisting of a rectangular large-width portion 712 and a rectangular narrow-width portion 713 which are connected with each other. The light source driver 711 incorporates various circuit elements therein, and supplies electricity to the light source 718.

Figure 30:
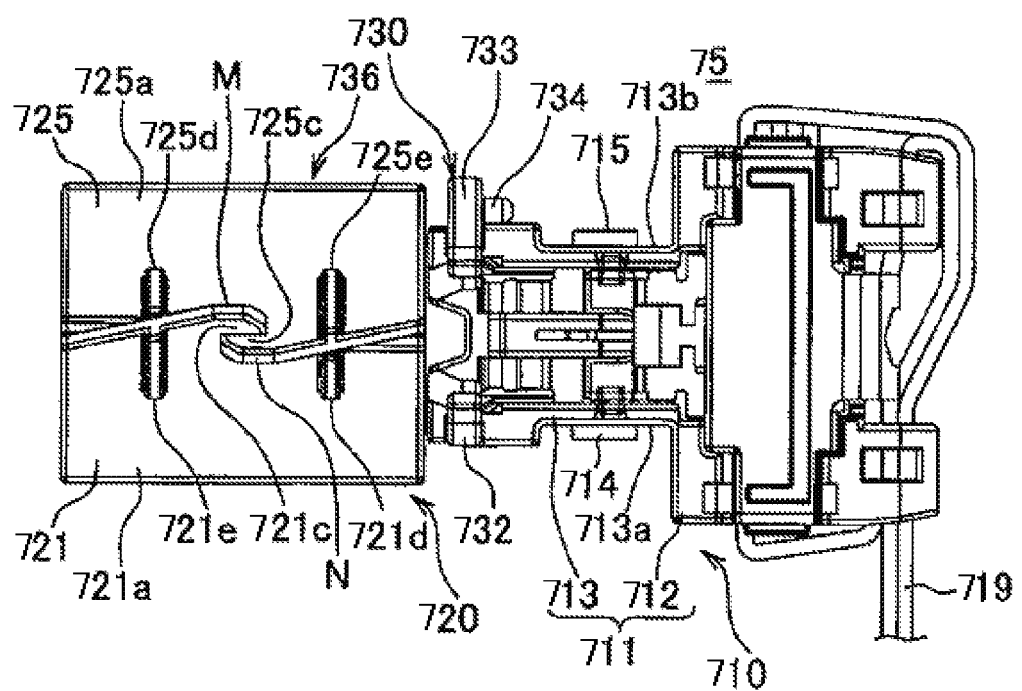
FIG. 30 is a bottom view of the lamp unit shown in FIG. 29.

A wire harness 719 which is electrically connected with the above-mentioned various circuit elements are pulled out from both side surfaces of the large-width portion 712 which are arranged opposite to each other in the width direction (vertical direction in FIG. 30). The wire harness 719 is arranged in the inside of the vehicle in a mutually bundled state, and end portions of the wire harness 719 are connected to a power source and the like not shown in the drawing.

A pair of locking pawls 714, 715 is integrally formed on both side surfaces 13a, 13b of the narrow width portion 713 which are arranged opposite to each other in the width direction respectively. These pawls 714, 715 are engageable with brackets 744, 745 which are mounted on a housing 740 of the designed member 76 described later. The pair of locking pawls 714, 715 is formed in a projecting manner with a wedge shape in transverse cross section while having the longitudinal direction thereof directed parallel to the connection direction of the large-width portion 712 and the narrow-width portion 713 (lateral direction in FIG. 30). A pair of flanges 716, 717 which projects in the direction orthogonal to the above-mentioned connection direction are formed, parallel to each other with an interval therebetween, on the other end portion of the narrow-width portion 13 opposite to one end portion which is connected to the large-width portion 712. A spaced apart portion between the pair of flanges 716, 717 is formed into an approximately circular shape in cross section. A base portion 730 of the light source protective member 720 (cover) described later is mounted on the spaced-apart portion such that the base portion 730 grasps (sandwiches) the periphery of the spaced-apart portion and hence, the spaced-apart portion functions as a mounting portion 735 which supports the light source protective member 720.

The light source 718 is, for example, a well-known electric part such as a bulb or an LED which emits light when electricity is supplied. The light source 718 includes a semi-spherical distal end portion 718a and a cylindrical body portion 718b which is connected to the distal end portion 718a. The light source 718 is mounted on the other end portion of the narrow-width portion 713 of the above-mentioned light source driver 711 in a state where the axial direction of the above-mentioned body portion 718b is arranged parallel to the above-mentioned connection direction, and the light source 718 projects from the light source driver 711. The light source 718 is electrically connected with the above-mentioned various circuit elements incorporated into the light source driver 711, and radiates light when electricity is supplied to the light source 718 from the light source driver 711.

The light source protective member 720 includes a cover body 736 and the base portion 730. The cover body 736 includes wall portions 721, 722, 723, 724, 725 and hinges 726, 727, 728, 729.

The wall portion 721 includes a planar portion 721a having an approximately rectangular plate shape, a front surface portion 721b having an approximately triangular plate shape which is connected to one longitudinal end of the planar portion 721a orthogonal to the planar portion 721a, a pawl portion 721c, and a pair of ribs 721d, 721e. The pawl portion 721c is formed on one lateral end of the planar portion 721a at a longitudinally center portion of the planar portion 721a in such a manner that the pawl portion 721c projects toward the other longitudinal end of the planar portion 721a. The pair of ribs 721d, 721e is formed on the planar portion 721a in such a manner that the ribs 721d, 721e project in the direction opposite to the front surface portion 721b. The pair of ribs 721d, 721e is arranged with an interval therebetween while the pawl portion 721c is positioned therebetween and the pair of ribs 721d, 721e is parallel to each other. Further, the longitudinal direction of the pair of ribs 721d, 721e is arranged along the lateral direction of the planar portion 721a. With respect to the pair of ribs 721d, 721e, one end portion of each rib is brought into contact with one lateral end of the planar portion 721a. The rib 721d is arranged closer to the other longitudinal end of the planar portion 721a than the rib 721e is arranged and is formed shorter than the rib 721e.

The wall portion 722 includes a planar portion 722a having a rectangular shape, and a front surface portion 722b having an approximately triangular plate shape which is connected to one longitudinal end of the planar portion 722a orthogonal to the planar portion 722a. With respect to the wall portion 722, one lateral end of the planar portion 722a is rotatably (that is, in a bendable manner) connected to the other lateral end of the planar portion 721a of the wall portion 721 by way of a hinge 726.

The wall portion 723 includes a planar portion 723a having a rectangular shape, and a front surface portion 723b having an approximately triangular plate shape which is connected to one longitudinal end of the planar portion 723a orthogonal to the planar portion 723a. With respect to the wall portion 723, one lateral end of the planar portion 723a is rotatably connected to the other lateral end of the planar portion 722a of the wall portion 722 by way of a hinge 727. Further, a full length of the planar portion 723a is set longer than full lengths of planer portions of other wall portions. The other longitudinal end of the planar portion 723a is connected to the base portion 730.

The wall portion 724 includes, in the same manner as the wall portion 722, a planar portion 724a having a rectangular shape, and a front surface portion 724b having an approximately triangular plate shape which is connected to one longitudinal end of the planar portion 724a orthogonal to the planar portion 724a. With respect to the wall portion 724, one lateral end of the planar portion 724a is rotatably connected to the other lateral end of the planar portion 723a of the wall portion 723 by way of a hinge 728.

The wall portion 725 includes, in the same manner as the wall portion 721, a planar portion 725a having an approximately rectangular plate shape, a front surface portion 725b having an approximately triangular plate shape which is connected to one longitudinal end of the planar portion 725a orthogonal to the planar portion 725a, a pawl portion 725c, and a pair of ribs 725d, 725e. The pawl portion 725c is formed on one lateral end of the planar portion 725a at a longitudinally center portion of the planar portion 725a in such a manner that the pawl portion 725c projects toward one longitudinal end of the planar portion 725a. The pair of ribs 725d, 725e is formed on the planar portion 725a in such a manner that the ribs 725d, 725e project in the direction opposite to the front surface portion 725b. The pair of ribs 725d, 725e is arranged with an interval therebetween while the pawl portion 725c sandwiched therebetween and the pair of ribs 725b, 725e is parallel to each other. Further, the longitudinal direction of the pair of ribs 725d, 725e is arranged along the lateral direction of the planar portion 725a. With respect to the pair of ribs 725d, 725e, one end portion of each rib is brought into contact with one lateral end of the planar portion 725a. The rib 725d is arranged closer to one longitudinal end of the planar portion 725a than the rib 725e is arranged and is formed shorter than the rib 725e. With respect to the wall portion 725, the other lateral end of the planar portion 725a is rotatably connected to the other lateral end of the planar portion 724a of the wall portion 724 by way of a hinge 729.

The wall portions 721, 722, 723, 724, 725 are formed using a hard synthetic resin or the like, for example. Full lengths (longitudinal lengths) and the widths (lateral lengths) of the planar portions 721a, 722a, 724a, 725a of the respective wall portions are set substantially equal to each other. The full length of the planar portion 723a is set larger than the full lengths of these planar portions, while the width of the planar portion 723a is set smaller than the widths of the respective planar portions. The hinges 726, 727, 728, 729 are formed using a synthetic resin or the like having resiliency, for example. The respective wall portions are connected in a juxtaposed manner with longitudinal directions of the respective planar portions thereof directed parallel to each other by the respective hinges.

Figure 27:
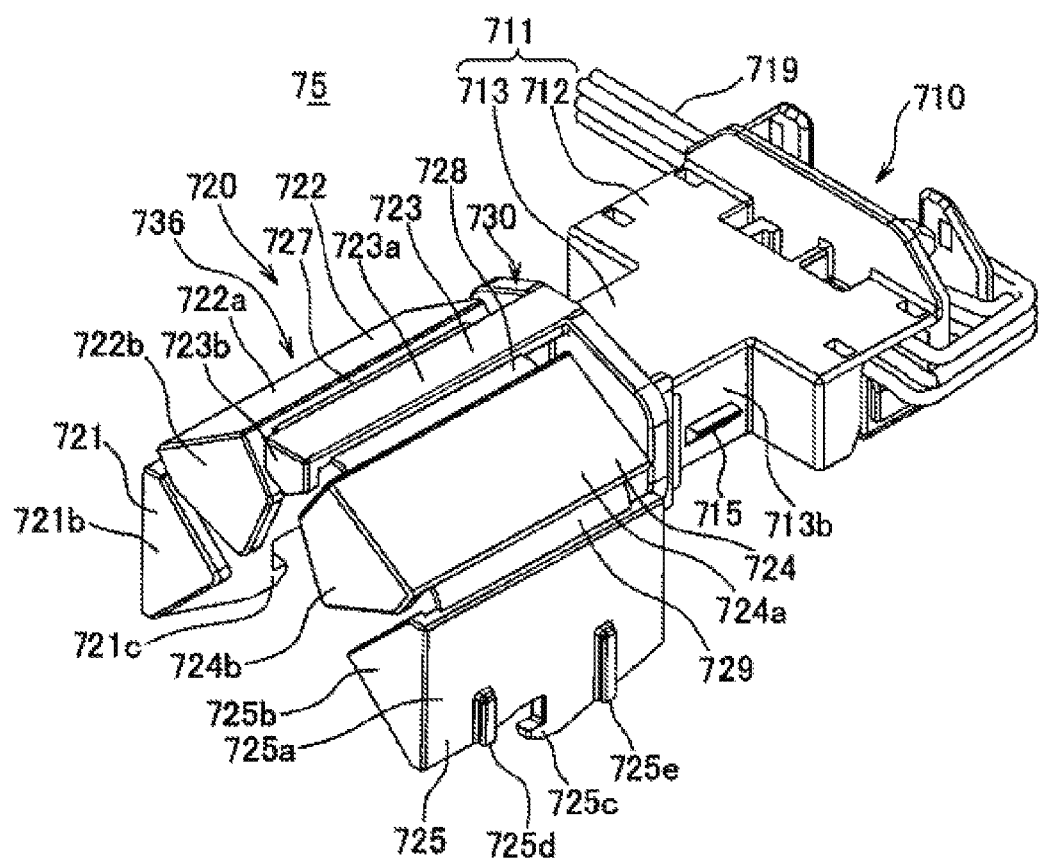
FIG. 27 is a perspective view as viewed from a front side of the lamp unit shown in FIG. 24 after assembling.
Figure 28:
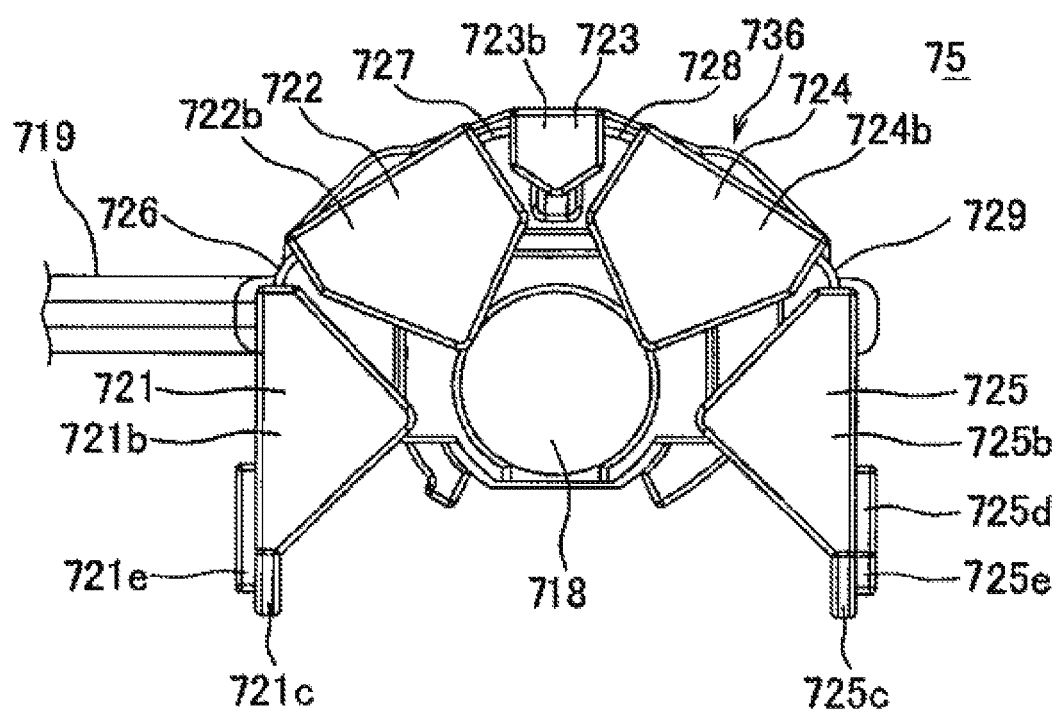
FIG. 28 is a front view of the lamp unit shown in FIG. 27.
Figure 29:
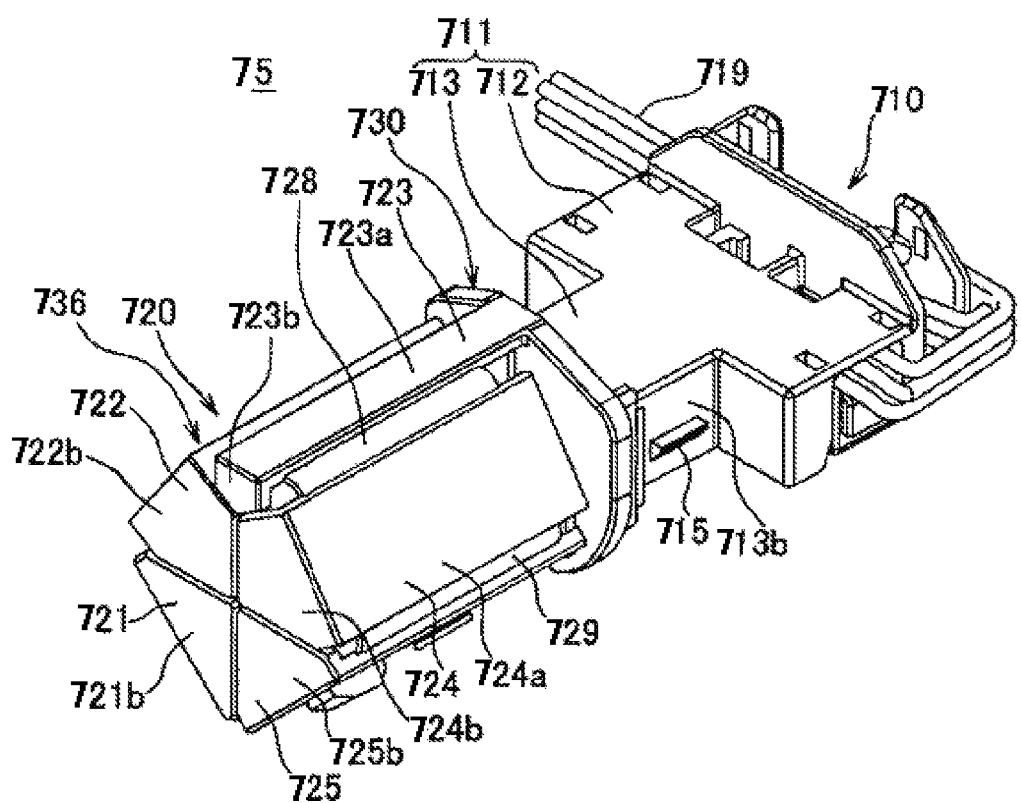
FIG. 29 is a perspective view showing a state in which a wall portion of the lamp unit shown in FIG. 27 is closed.

The respective wall portions are connected to each other in a bendable (rotatable) manner due to the respective hinges. The wall portions 721, 725 are openable and closeable in a double-hinged-door manner. Accordingly, by bending the respective hinges such that the wall portion 721 and the wall portion 725 are separated from each other, the respective wall portions are arranged in a semi-cylindrical shape such that the light source 718 is exposed toward the designed member (opened condition) (that is, toward the inside of the vehicle) (FIG. 27, FIG. 28). Alternatively, by bending the respective hinges such that the wall portion 721 and the wall portion 725 approach to each other, one lateral end of the planar portion 721a of the wall portion 721 and one lateral end of the planar portion 725a of the wall portion 725 are made to approach to each other thus arranging the respective wall portions into a cylindrical shape whereby the respective wall portions cover the periphery of the light source 718 (closed condition) (FIG. 29, FIG. 30).

The front surface portions 721b, 722b, 723b, 724b, 725b formed on the respective wall portions form, when the respective wall portions are arranged in a cylindrical shape, one wall by abutting the edge portions thereof to each other thus covering the distal-end-portion 718a side of the light source 718. Further, the pawl portion 721c and the pawl portion 725c described above are formed to engage with each other. Due to the engagement of the pawl portion 721c and the pawl portion 725c, it is possible to maintain a state where one lateral end of the planar portion 721a of the wall portion 721 and one lateral end of the planar portion 725a of the wall portion 725 are arranged close to each other. That is, it is possible to maintain a state where the respective wall portions are arranged in a cylindrical shape. Further, the pawl portions 721c, 725c are formed so as to engage with pawl receiving portions 746c, 747c formed on the designed member 76 described later.

The base portion 730 includes a base 731 (engagement portion), a pair of arms 732, 733, and a guide projection 734.

The base 731 has an approximately rectangular plate shape, and the pair of arms 732, 733 is connected to both longitudinal end portions of the base 731 respectively in the direction orthogonal to the longitudinal direction. That is, the base 731 and the pair of arms 732, 733 are connected with each other in an approximately U shape. In the base portion 730, a longitudinal center portion of the base 731 is connected to the other longitudinal end of the planar portion 723a in a state where the base portion 730 orthogonally intersects with the planar portion 723a of the above-mentioned wall portion 723. The base portion 730 is arranged to face the front surface portion 723b of the wall portion 723 in an opposed manner with the planar portion 723a sandwiched therebetween.

The pair of arms 732, 733 is elastically deformable, and a space which conforms to an outer profile of the above-mentioned mounting portion 735 is defined between the pair of arms 732, 733. A distance between distal ends of the arms is set smaller than a diameter of the mounting portion 735. Due to such a constitution, the mounting portion 735 can be inserted between the pair of arms 732, 733 and can be sandwiched by the pair of arms 732, 733. That is, the mounting portion 735 is sandwiched between the pair of arms 732, 733 and hence, the light source protective member 720 is connected to the light source driver 711. The guide projection 734 is mounted on the arm 733 in a projecting manner such that the longitudinal direction of the projection 734 is arranged parallel to the inserting direction of the mounting portion 735 into the space defined between the pair of arms 732, 733. The guide projection 734 is brought into contact with the narrow-width portion 713 of the functional member 710 so as to guide the functional member 710 in the inserting direction when the mounting portion 735 is inserted into the space defined between the pair of arms 732, 733. The guide projection 734 also suppresses a play between the functional member 710 and the base portion 730 (that is, light source protective member 720) after the mounting portion 735 is inserted.

The designed member 76 includes the housing 740 and a lens portion 60.

The housing 740 includes a base portion 741, an opening portion 742, brackets 744, 745, cover holders 746, 747, and a ceiling pawl 748. The base portion 741 is, for example, made of a synthetic resin or the like and is formed into an approximately rectangular plate shape, and the opening portion 742 which penetrates the base portion 741 in a rectangular shape is formed at the center of the base portion 741. A pair of lens pawls 741a, 741b is respectively formed on both longitudinal end portions of the base portion 741.

The brackets 744, 745 are respectively formed of an elastically deformable plate, and are integrally formed on the base portion 741. The brackets 744, 745 are formed on an upper surface of the base portion 741 (surface positioned at an upper side in FIG. 31) in a vertically raised manner at a position closer to one longitudinal end portion of the base portion 741. The brackets 744, 745 are arranged to face each other in an opposed manner in the lateral direction of the base portion 741 with a gap which is equal to a width of the above-mentioned narrow-width portion 713 therebetween. On inner surfaces (that is, opposedly facing surfaces) of the brackets 744, 745, groove portions 744a, 745a which respectively engage with the pair of lock pawls 714, 715 formed on the above-mentioned narrow-width portion 713 are formed. Further, on distal ends of the brackets 744, 745, inclined surfaces 744b, 745b which are gradually inclined inwardly corresponding to the increase of the distance from the distal ends toward proximal ends of the respective portions 744, 745 (toward a side where the respective portions 744, 745 are brought into contact with the base portion 41) are formed.

By inserting the narrow-width portion 713 of the functional member 710 between inner sides of the brackets 744, 745, the functional member 710 is sandwiched and fixed. When the narrow-width portion 713 is inserted between the brackets 744, 745, firstly, both side surfaces of the narrow-width portion 713 are brought into contact with the inclined surfaces 744b, 745b respectively so that the narrow-width portion 713 is guided to the inside between the brackets 744, 745. Further, when the insertion of the narrow-width portion 713 advances, the pair of lock pawls 714, 715 of the narrow-width portion 713 are respectively brought into contact with the inclined surfaces 744b, 745 so that the brackets 744, 745 are elastically deformed and are deflected in the direction that the brackets 744, 745 are separated from each other. When the insertion further advances, the pair of lock pawls 714, 715 gets over the inclined surfaces 744b, 745b and is fitted into the groove portions 744a, 745a so that the deformed brackets 744, 745 return to an original shape. Accordingly, the brackets 744, 45 fix the narrow-width portion 713 therebetween by clamping and, at the same time, the pair of lick pawls 714, 715 engage with the groove portions 744a, 745a respectively thus preventing the removal of the functional member 710.

The cover holders 746, 747 are respectively formed into a rectangular cylindrical shape having a rectangular transverse cross section. The cover holders 746, 747 are integrally mounted on an upper surface of the base portion 741 in a state that opening end portions of the rectangular cylinders are directed in the same direction as the upper surface of the base portion 741. The cover holders 746, 747 are formed in a raised manner such that the longitudinal directions of the cover holders 746, 747 are arranged parallel to each other in the transverse cross section and face each other in the lateral direction of the base portion 741 with the opening 742 sandwiched therebetween.

A longitudinal length of the cover holder 746 in transverse cross section is set substantially equal to a longitudinal length of the planar portion 721a of the wall portion 721, while a lateral length of the cover holder 746 in transverse cross section is set substantially equal to a thickness of the planar portion 721a of the wall portion 721. That is, cover holder 746 is formed such that one lateral end (indicated by symbol M in FIG. 31) of the planar portion 721a can be inserted into the cover holder 746. In the same manner as the cover holder 746, a longitudinal length of the cover holder 747 in transverse cross section is substantially equal to a longitudinal length of the planar portion 725a of the wall portion 725, and a lateral length of the cover holder 747 in transverse cross section is substantially equal to a thickness of the planar portion 725a of the wall portion 725. That is, the cover holder 747 is formed such that one lateral end (indicated by symbol N in FIG. 31) of the planar portion 725a can be inserted into the cover holder 747.

On an inner center portion of the cover holder 746, a pawl receiving portion 46c which projects toward the other longitudinal end of the base portion 741 (that is, on a side opposite to the brackets 744, 745) is formed. Further, in a wall 461 of the cover holder 746 which is positioned closer to the lateral end portion of the base portion 741, a pair of slits 746a, 746b is formed. When one end M of the planar portion 721a of the wall portion 721 is inserted into the cover holder 746, the pawl receiving portion 746c and the pawl portion 721c of the wall portion 721 engage with each other so that the wall portion 721 is fixed to the cover holder 746. Further, the ribs 721d, 721e formed on the wall portion 721 are inserted into the pair of slits 746a, 746b respectively thus preventing the occurrence of a play after fixing the wall portion 721.

In the same manner, on an inner center portion of the cover holder 747, a pawl receiving portion 747c which projects toward one longitudinal end of the base portion 741 (that is, on a side of the brackets 744, 745) is formed. Further, in a wall 7471 of the cover holder 747 which is positioned closer to the lateral end portion of the base portion 741, a pair of slits 747a, 747b is formed. When one end N of the planar portion 725a of the wall portion 725 is inserted into the cover holder 747, the pawl receiving portion 747c and the pawl portion 725c of the wall portion 725 engage with each other so that the wall portion 725 is fixed to the cover holder 747. Further, the ribs 725d, 725e formed on the wall portion 725 are inserted into the pair of slits 747a, 747b respectively thus preventing the occurrence of play after fixing the wall portion 725.

The ceiling pawl 748 is a member which is formed by bending an elongated planar plate into an approximately U shape, and is elastically deformable in the direction that a U-shaped width is narrowed. An erected portion 748b of the ceiling pawl 748 is integrally connected to the other longitudinal end portion of the base portion 741 in the vicinity of an edge portion of the opening portion 742, while the head portion 748c of the ceiling pawl 748 forms an open end and is positioned in the vicinity of the other longitudinal end of the base portion 741 (that is, lens-portion mounting pawl 741a). An neck portion 748a which projects toward the outside from the other longitudinal end of the base portion 741 is formed on the head portion 748c of the ceiling pawl 748. The ceiling pawl 748, when the housing 740 is inserted into the opening 4 of the indoor illumination lamp mounting portion 3a of the ceiling portion 3, is elastically deformed thus allowing the base portion 741 and the neck portion 748a to clamp the vicinity of the edge portion of the opening 74 of the indoor illumination lamp mounting portion 73a whereby the housing 740 (that is, indoor illumination lamp 1) is fixed to the ceiling 73.

The lens portion 760 includes a frame portion 761, an opening portion 762 and a lens 763. The frame portion 761 is formed into an approximately rectangular frame using a synthetic resin, and the opening portion 762 is formed inside the frame portion 761. An outer size of the frame portion 761 is larger than a profile of the base portion 741 by one size. The opening portion 762 is formed in a shape substantially equal to the profile of the base portion 741. A pair of mounting-pawl receiving portions 762a, 762b is formed on both longitudinal end portions of the opening portion 762 respectively. The pair of mounting-pawl receiving portions 762a, 762b engages with a pair of lens pawls 741a, 741b respectively thus fixing the lens portion 760 and the housing 740 to each other. The lens 763 is made of, for example, a transparent or semitransparent synthetic resin, glass or the like. The lens 763 is fitted into the opening portion 762 and allows a light which is radiated from the light source 718 to pass therethrough.

Figure 25:
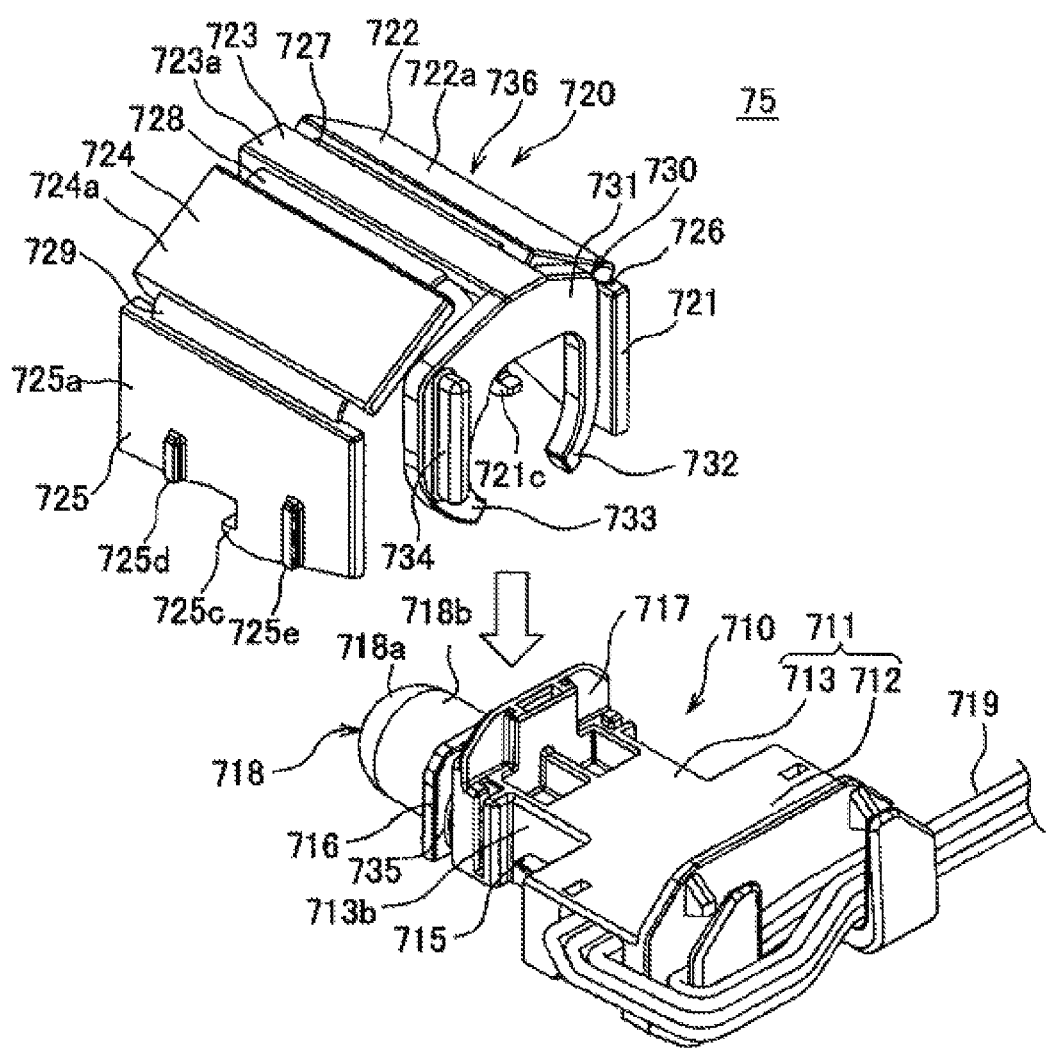
FIG. 25 is a perspective view as viewed from a rear side of the lamp unit shown in FIG. 24 before assembling.
Figure 26:
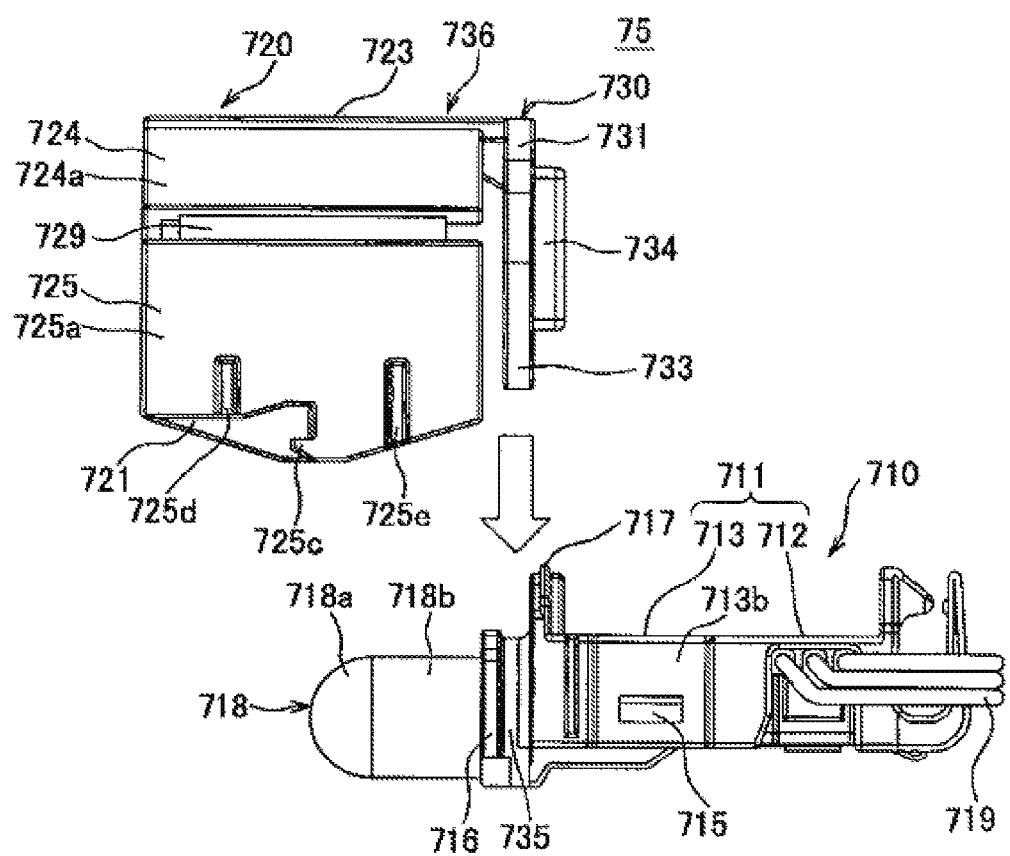
FIG. 26 is a side view of the lamp unit shown in FIG. 24 before assembling.

Next, the assembling of the lamp unit 75 and the indoor illumination lamp 71 is explained. Firstly, the functional member 710 and the light source protective member 720 of the lamp unit 75 are assembled respectively. Here, with respect to the cover body 736 of the light source protective member 720, the wall portion 721 and the wall portion 725 are opened in a double-hinged-door manner and are spaced apart from each other so that the respective wall portions are arranged in a semi-cylindrical shape. Next, as shown in FIG. 25 and FIG. 26, the mounting portion 735 of the functional member 710 is inserted between the pair of arms 732, 733 of the base portion 730 of the light source protective member 720 so as to connect and fix the functional member 710 and the light source protective member 720 to each other as shown in FIG. 27 and FIG. 28.

Then, as shown in FIG. 29 and FIG. 30, one lateral end M of the wall portion 721 and one lateral end N of the wall portion 725 are made to approach to each other so as to close a gap between these ends M,N, and the pawl portion 721c and the pawl portion 725c engage with each other thus arranging the respective wall portions in a cylindrical shape. Accordingly, the whole periphery of the light source 718 is covered with the cover body 736. The lamp unit 75 is transported in such a state until the lamp unit 75 is mounted on a vehicle (transportation step in Claims).

Figure 31:
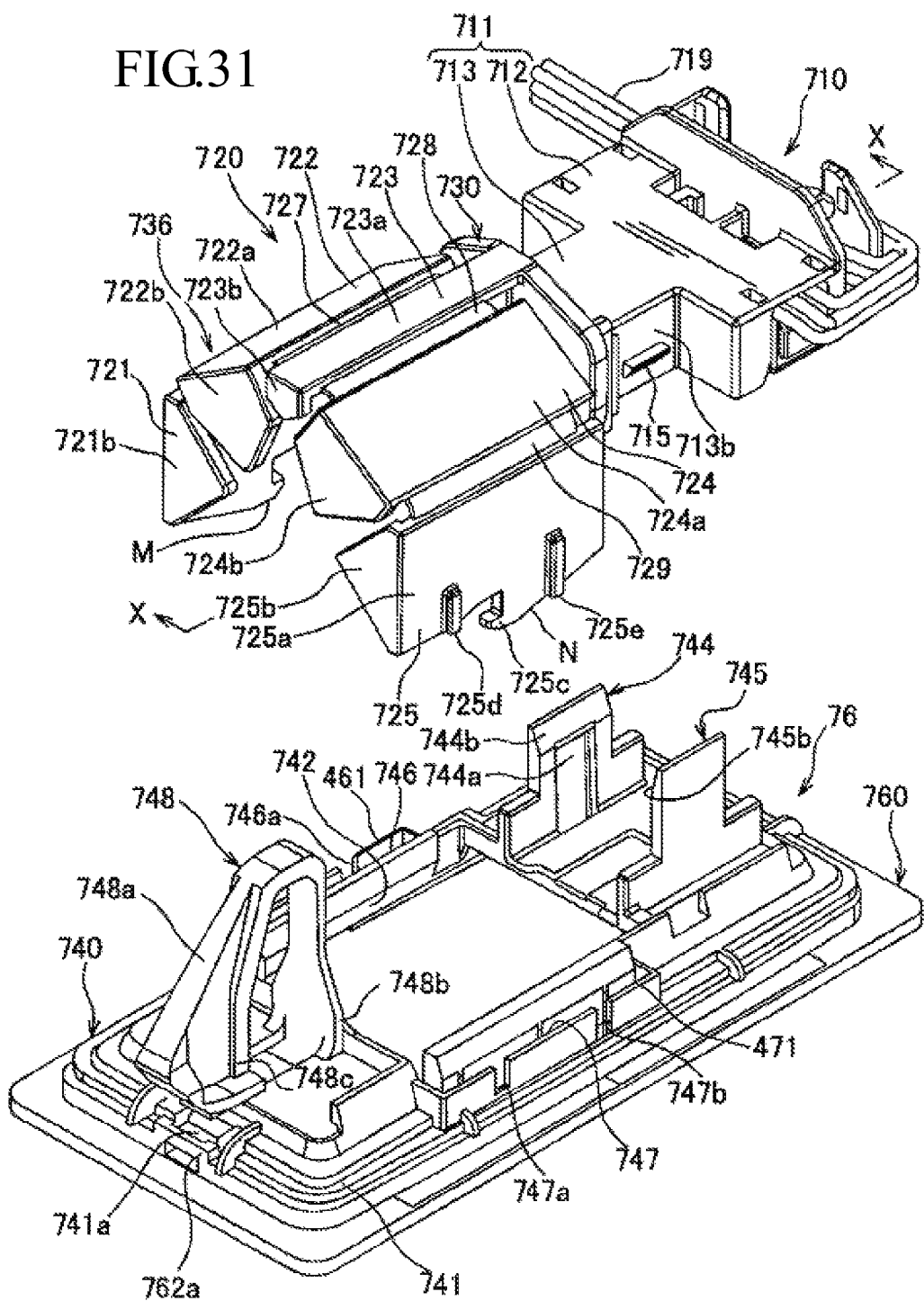
FIG. 31 is a perspective view showing a state before the lamp unit shown in FIG. 27 is assembled to an designed member.
Figure 32:
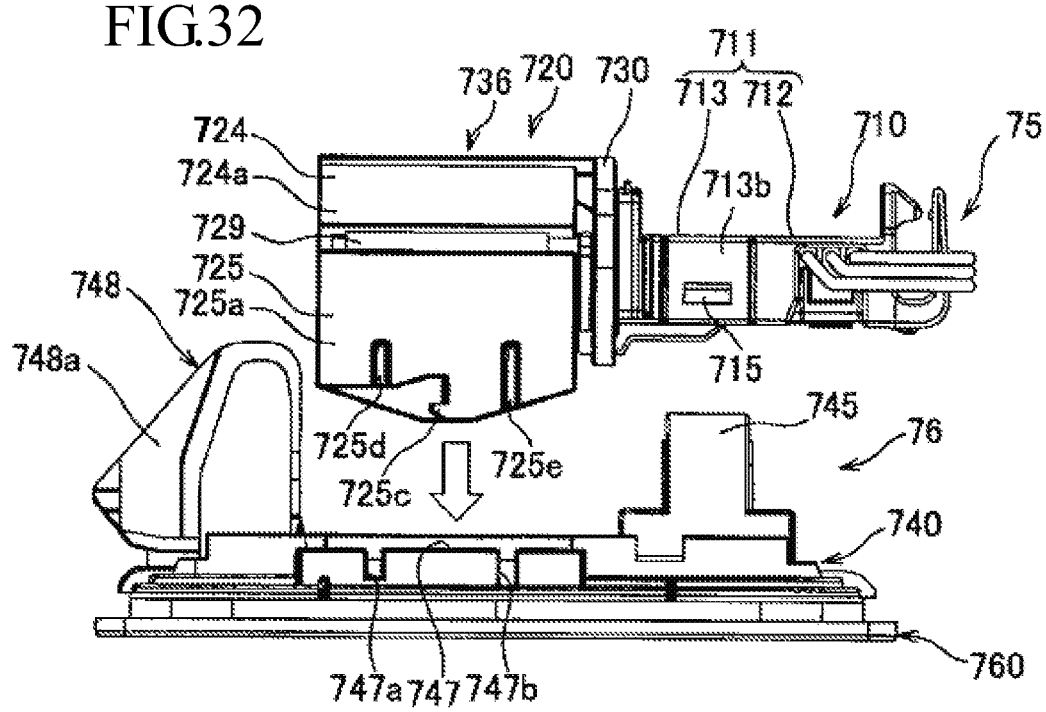
FIG. 32 is a side view of the lamp unit and the designed member shown in FIG. 31.
Figure 33:
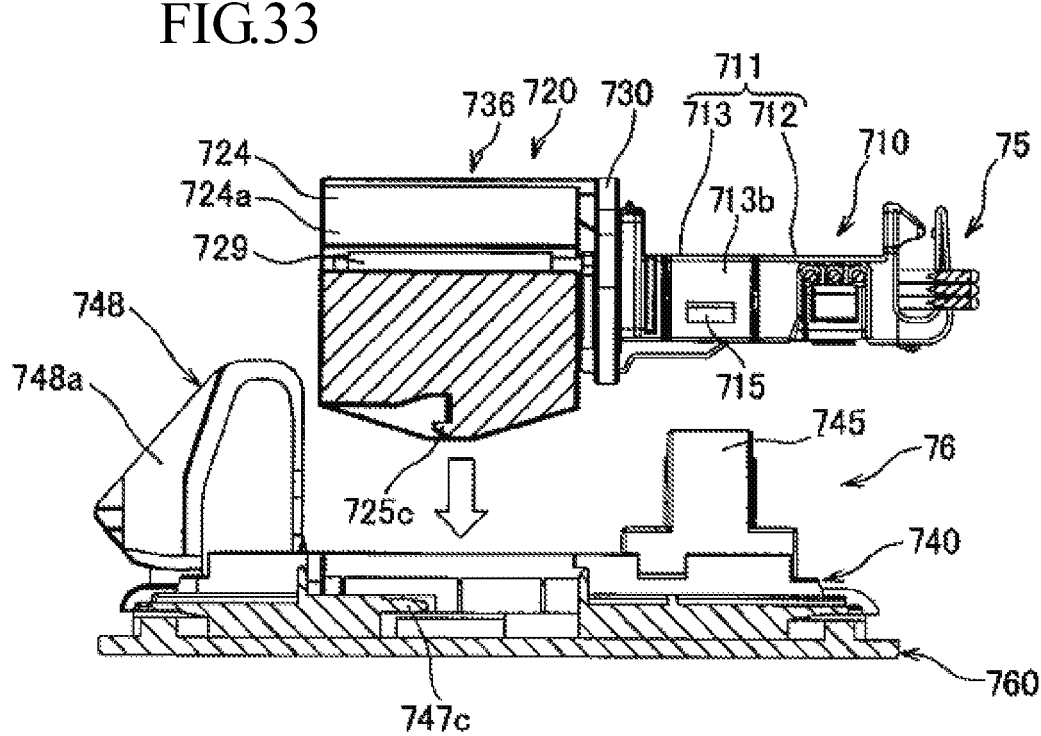
FIG. 33 is a cross-sectional view taken along a line X-X in FIG. 31.
Figure 34:
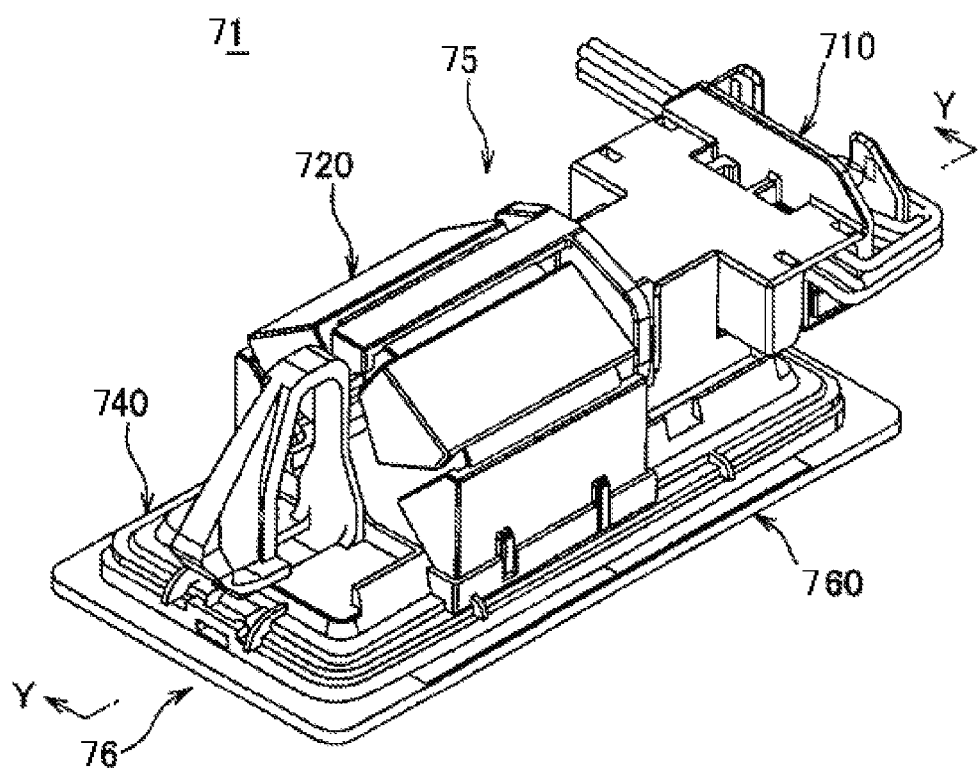
FIG. 34 is a perspective view showing a state after the lamp unit shown in FIG. 27 is assembled to the designed member.
Figure 35:
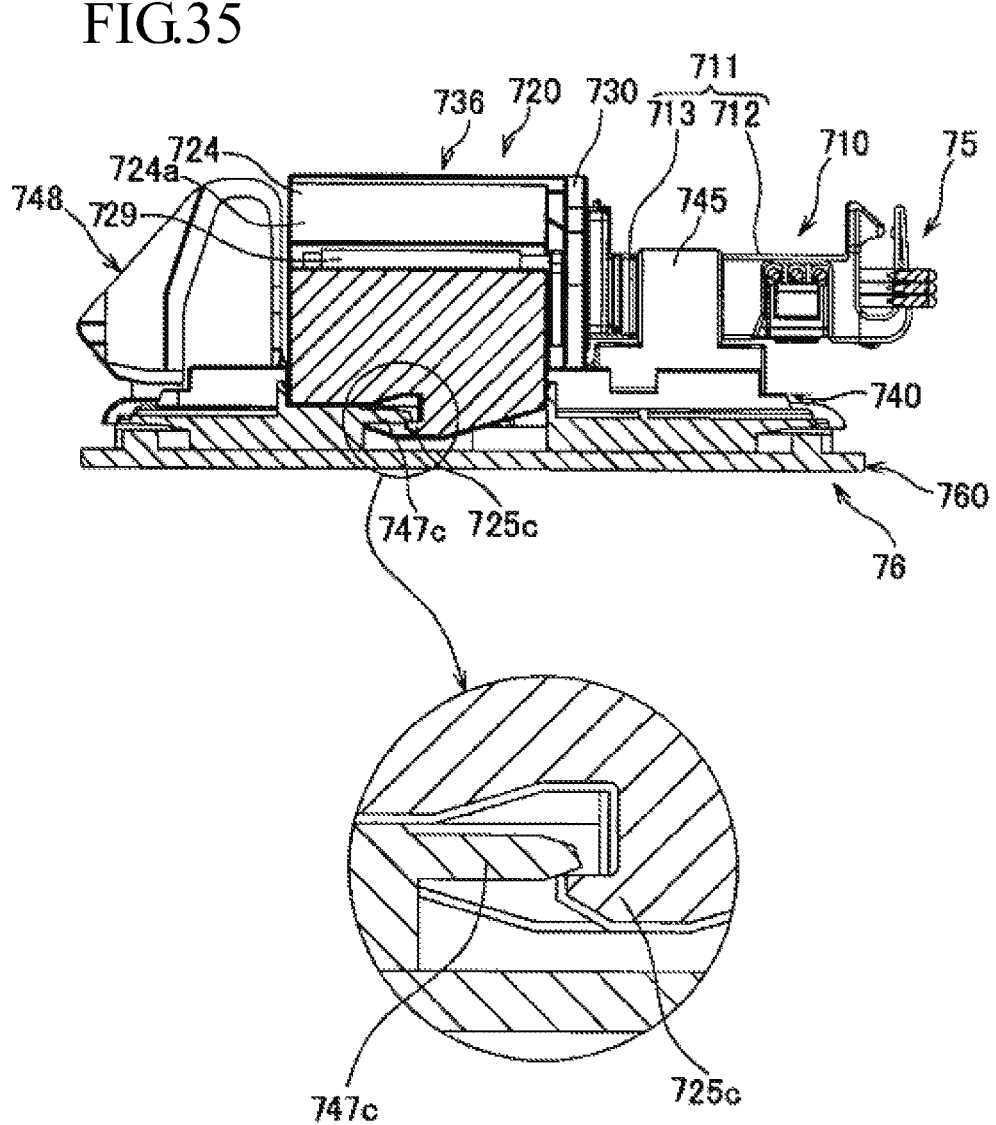
FIG. 35 is a cross-sectional view taken along a line Y-Y in FIG. 34.
Figure 36:
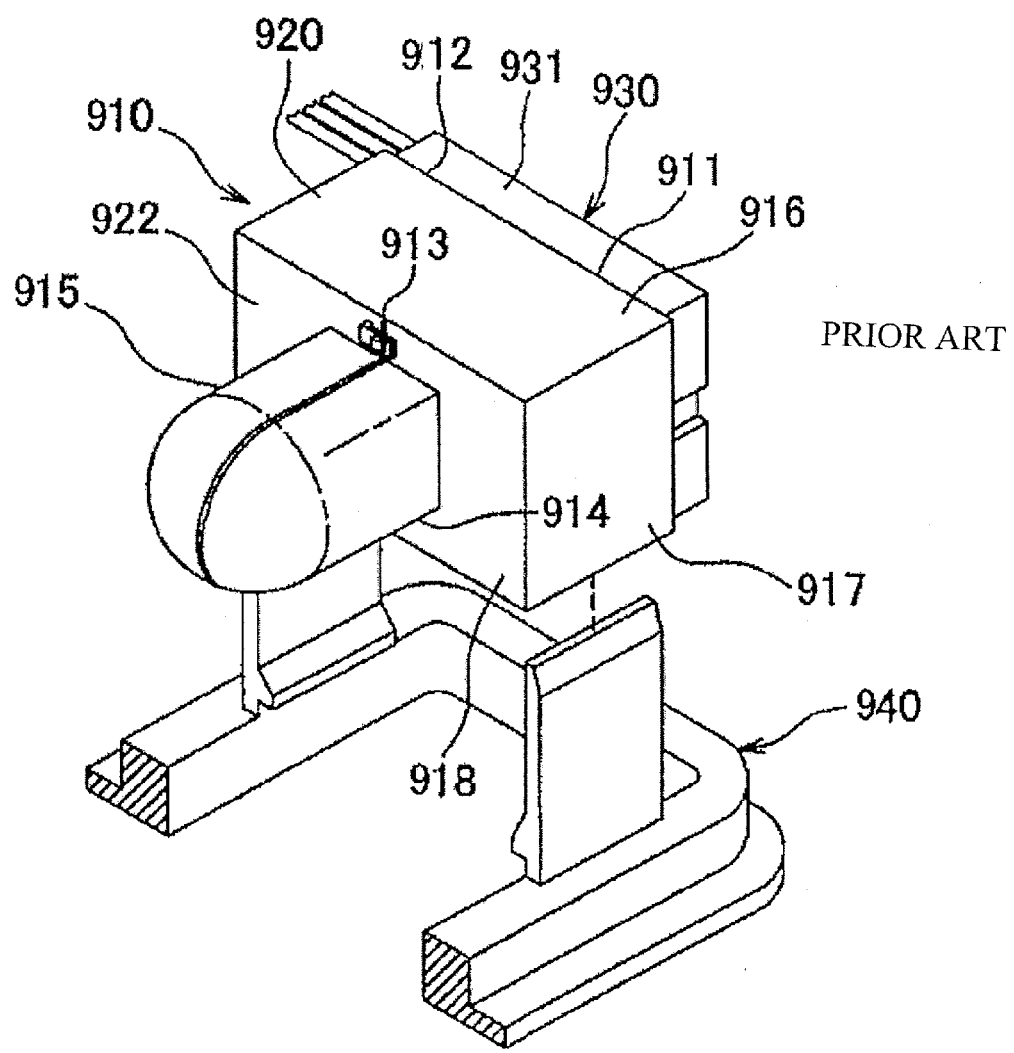
FIG. 36 is a perspective view showing a related lamp unit.

Then, the lamp unit 75 is mounted on the designed member 76 to which the housing 740 and the lens portion 760 are preliminarily assembled. Here, as shown in FIG. 31, the respective walls of the cover body 736 are arranged in a semi-cylindrical shape in such a manner that the pawl portion 721c and the pawl portion 725c are disengaged from each other, the wall portion 721 and the wall portion 725 are opened in a double-hinged-door manner so as to be separated from each other, and the light source 718 is exposed toward the inside of the vehicle through the opening portion 742 of the designed member 76. (mounting step in Claims). Then, in the lamp unit 75, as shown in FIG. 32 and FIG. 33, the narrow-width portion 713 of the light source driver 711 is inserted between the brackets 744, 745 of the housing 740 and, at the same time, the lateral one end M of the wall portion 721 is inserted into the cover holder 746, and the lateral one end N of the wall portion 725 is inserted into the cover holder 747. As shown in FIG. 34 and FIG. 35, the pair of locking pawls 714, 715 of the narrow-width portion 713 respectively engage with the groove portions 744a, 745a of the brackets 744, 745, the pawl portion 721c of the wall portion 721 engages with the pawl receiving portion 746c of the cover holder 746, and the pawl portion 725c of the wall portion 725 engages with the pawl receiving portion 747c of the cover holder 747. Accordingly, the lamp unit 75 is mounted on the designed member 76 thus assembling the indoor illumination lamp 1. Thereafter, the indoor illumination lamp 1 is mounted on the trim 73a mounted on the ceiling 73 in the inside of the vehicle.

In this embodiment, the wall portions 721, 725 correspond to the lid portion and the pair of door portions in Claims. One lateral end M of the wall portion 721 and one lateral end N of the wall portion 725 correspond to the end portions of the pair of door portions in Claims respectively. The pawl portions 721c, 725c correspond to the engaging portions and the pair of pawl portions in Claims.

As has been explained above, according to the present invention, the lamp unit includes the light source protective member 720 which includes the cover body 736 which is formed so as to cover the periphery of the light source 718 and is connected to the light source driver 711 by way of the base portion 730, and the wall portions 721, 725 of the cover body 736 which are opened so as to expose the light source 718 toward the inside of the vehicle through the opening portion 742 of the designed member 76 when the light source driver 711 is mounted on the designed member 76. Accordingly, at the time of transporting the lamp unit 75 or the like, before the light source driver 711 is mounted on the designed member 76, the periphery of the light source 718 is covered with the cover body 736 and hence, it is possible to protect the light source 718 from an impact from the surrounding. Further, when the light source driver 711 is mounted on the designed member 76 in the vehicle, it is possible to expose the light source 718 toward the inside of the vehicle by opening the wall portions 721, 725 thus allowing the light source 718 to illuminate the inside of the vehicle and, at the same time, it is possible to protect the light source 718 from water droplets from an area above the ceiling 73 or dusts by the cover body 736. Accordingly, the light source 718 can be protected after mounting the lamp unit to the interior wall surface of the vehicle or the like and, at the same time, the light source protection performance during the transportation can be enhanced.

Further, the light source protective member 720 includes the pawl portions 721c, 725c which engage with the pawl receiving portions 746c, 747c of the cover holders 746, 747 of the designed member 76 when the light source driver 711 is mounted on the designed member 76. Accordingly, the lamp unit 75 can be mounted on the designed member 76 at two portions consisting of the light source driver 711 and the light source protective member 720 and hence, the number of mounting portions is increased whereby it is possible to surely mount the lamp unit 75 on the designed member 76.

Further, the wall portions 721, 725 are configured to be openable and closeable in a double-hinged-door manner. The pawl portions 721c, 725c are mounted on one lateral end M of the wall portion 21 and one lateral end N of the wall portion 725 which are arranged close to each other when the wall portions 721, 725 are in a closed state such that the pawl portions 721c, 725c face each other in an opposed manner. The pawl portions 721c, 725c are formed such that the pawl portions 721c, 725c engage with the designed member 76 when the wall portions 721, 725 are in an open state and the pawl portions 721c, 725c engage with each other when the wall portions 721, 725 are in a closed state. Accordingly, the wall portions 721, 725 which constitute the light source protective member 720 can be mounted on the designed member 76 due to the engagement of the pawl portions 721c, 725c with the designed member 76, and a state where the wall portions 721, 725 are closed can be maintained due to the engagement of the pawl portions 721c, 725c with each other. Accordingly, the pawl portions 721c, 725c can simultaneously perform the above-mentioned two functions thus providing the simple structure which does not require the provision of a plurality of engaging portions.

In the above-mentioned embodiment, the light source protective member 720 includes the plurality of wall portions which are connected to each other in bendable manner from each other. However, the present invention is not limited to such an embodiment. For example, the present invention is applicable to any constitution provided that the cover body is formed so as to cover the periphery of the light source 718 and the lid portion (door portions) which is mounted on the cover body is openable so as to expose the light source 718 toward the inside of the vehicle when the light source driver 711 is mounted on the wall surface or the like. That is, the present invention is applicable to the constitution where the light source protective member includes a semi-cylindrical cover body and a pair of door portions which is rotatably connected to both edges of the cover body arranged opposite to each other in the direction orthogonal to the axial direction of the cover body and are openable and closeable in a double-hinged-door manner, the constitution where a single-swinging door portion is used in place of a pair of doors which is openable and closeable in a double-hinged-door manner.

The above-mentioned embodiment merely exemplifies a typical mode of the present invention and hence, the present invention is not limited to the embodiment. That is, various modifications can be carried out without departing from the gist of the present invention.

The invention claimed is:

1. An illumination lamp comprising:
a cover including an engagement portion;
a functional member including a light emitting element and a mounting portion, the light emitting element covered by the cover while the engagement portion is engaged with the mounting portion; and
a designed member including a cover holder and a lock, the lock locking the functional member, and the cover holder holding the cover,
wherein the engagement portion clamps and holds the mounting portion of the functional member,
wherein the cover comprises:
a main body; and
a pair of wall portions, each wall portion attached to the main body rotatable from an open condition where the light emitting element exposed between the wall portions to a closed condition where the wall portions cover the periphery of the light emitting element, the one of the wall portions having a first pawl, the other of the wall portions having a second pawl,
wherein the first pawl and the second pawl are engaged to each other in the closed condition.

2. The illumination lamp according to claim 1, wherein the cover includes a cutout portion.

3. The illumination lamp according to claim 1, wherein the cover includes a plurality of vent holes on a surface thereof.

4. The illumination lamp according to claim 2, wherein the cover includes: a main body; a removable portion; and a connector connecting the main body and the removable portion, wherein the connector has an elongated shape which is defined by the cutout portion.

5. The illumination lamp according to claim 1, wherein the engagement portion is a projection, and the mounting portion is a groove.

6. The illumination lamp according to claim 1, wherein the designed member includes a bezel and a lens attached to the bezel, and the cover holder is provided between the bezel and the lens.

7. The illumination lamp according to claim 6, wherein the cover holder is a groove holding an end portion of at least one side surface of the cover.

8. The illumination lamp according to claim 1, wherein the main body includes a rib and the cover holder includes a slit into which the rib is inserted.

9. The illumination lamp according to claim 1, wherein the engagement portion includes a pair of arms which clamps and holds the mounting portion of the functional member.

10. An assembling structure of an illumination lamp with an opening provided on an interior member of a vehicle room, comprising:
a cover including an engagement portion;
a functional member including a light emitting element and a mounting portion, the light emitting element has an illuminating surface covered by the cover and is mounted on the mounting portion; and
a designed member including a cover holder, a bezel, and a claw, the cover holder holding the cover, the bezel attached to a periphery of the opening from one side of the opening, and the claw locked on the periphery from the other side of the opening,
wherein the engagement portion clamps and holds the mounting portion of the functional member.

11. The assembling structure according to claim 10, wherein the engagement portion includes a pair of arms which clamps and holds the mounting portion of the functional member.

12. An assembling structure of an illumination lamp with an opening provided on an interior member of a vehicle room, comprising:
a cover including an engagement portion; and
a functional member including a light emitting element and a mounting portion, the light emitting element has an illuminating surface covered by the cover and is mounted on the mounting portion,
wherein a size of an assembly of the cover and the functional member is smaller than a size of the opening, and the engagement portion clamps and holds the mounting portion of the functional member.

13. The assembling structure according to claim 12, wherein the engagement portion includes a pair of arms which clamps and holds the mounting portion of the functional member.

* * * * *